(12) United States Patent
Baumann et al.

(10) Patent No.: US 7,390,021 B2
(45) Date of Patent: *Jun. 24, 2008

(54) MODULAR FRAME LOAD HANDLER WITH TRANSLATABLE BOOM CARRIAGE

(75) Inventors: James A. Baumann, Sheboygan, WI (US); Travis A. Stuart, Ozaukee, WI (US); Daniel K. Schlegel, Milwaukee, WI (US); David G. Petrovic, Ozaukee, WI (US); Philip G. Schaffner, Ozaukee, WI (US); Richard F. King, Ozaukee, WI (US); James R. Wisnoski, Dakota, MN (US)

(73) Assignee: JLG OmniQuip, Inc., Hagerstown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/600,758

(22) Filed: Nov. 17, 2006

(65) Prior Publication Data

US 2007/0071587 A1     Mar. 29, 2007

Related U.S. Application Data

(60) Continuation of application No. 10/795,586, filed on Mar. 9, 2004, now Pat. No. 7,182,369, which is a division of application No. 09/852,669, filed on May 11, 2001, now Pat. No. 6,726,436, which is a continuation-in-part of application No. 09/568,798, filed on May 11, 2000, now Pat. No. 6,757,958.

(51) Int. Cl.
    *B62D 21/00*    (2006.01)

(52) U.S. Cl. .................... 280/781; 296/203.01

(58) Field of Classification Search ............... 280/781, 280/797, 798, 786, 124.109, 414.1; 180/312, 180/291, 311; 296/205
See application file for complete search history.

(56) References Cited

U.S. PATENT DOCUMENTS 2,107,382 A     2/1938   Maddock (Continued)

FOREIGN PATENT DOCUMENTS

EP     0 043 228     1/1982

(Continued)

OTHER PUBLICATIONS

International Search Report dated Mar. 13, 2002 in International Patent Application No. PCT/US01/15261.

*Primary Examiner*—Ruth Ilan
*Assistant Examiner*—Drew J. Brown
(74) *Attorney, Agent, or Firm*—Nixon & Vanderhye P.C.

(57) ABSTRACT

A load handler with a modular frame and the manufacture and assembly of the frame and loader and components that may be used therein. A frame is provided that has a low pivot point for a boom. The frame has left and right side rails, and front and rear cross rails, each having a closed cross-section construction. The side rails and cross rails are modular and the cross rails of a selected size are configured to fit a plurality of sizes of side rails, such that the same size cross rails may be used to construct a variety sizes and capabilities of load handling vehicles in a flow type manufacturing process. A structural beam is provided having plates interconnected along their lengths to form the beam having a box-shaped closed cross-section having a perimeter generally along the widths of the plates and forming a beam cavity within the perimeter.

6 Claims, 15 Drawing Sheets

U.S. PATENT DOCUMENTS

| | | | |
|---|---|---|---|
| 3,131,493 A | 5/1964 | Le Tourneau | |
| 3,799,362 A | 3/1974 | Oswald et al. | |
| 3,895,728 A | 7/1975 | Heggen | |
| 3,984,141 A * | 10/1976 | Gilette et al. | 296/203.01 |
| T0,966,007 I4 * | 1/1978 | Liehr et al. | 280/797 |
| 4,151,920 A | 5/1979 | Shoup | |
| 4,215,971 A | 8/1980 | Itey-Bernard | |
| 4,224,818 A | 9/1980 | Jones et al. | |
| 4,290,642 A | 9/1981 | Wise | |
| 4,415,181 A | 11/1983 | McCall et al. | |
| 4,621,973 A | 11/1986 | Langenfeld et al. | |
| 4,865,378 A | 9/1989 | Filtri et al. | |
| 4,874,285 A | 10/1989 | Bubik | |
| 4,900,083 A | 2/1990 | Kumasaka et al. | |
| 4,930,972 A | 6/1990 | Little | |
| 4,958,844 A | 9/1990 | Hancock | |
| 4,986,721 A * | 1/1991 | Lowder et al. | 414/685 |
| 5,002,299 A * | 3/1991 | Firehammer et al. | 280/414.1 |
| 5,090,105 A | 2/1992 | DeRees | |
| 5,123,805 A | 6/1992 | Ishimori et al. | |
| 5,203,194 A | 4/1993 | Marquardt | |
| 5,255,752 A | 10/1993 | Nakamura et al. | |
| 5,322,208 A | 6/1994 | Hinrichs et al. | |
| 5,478,192 A | 12/1995 | Bentivoglio | |
| 5,718,048 A | 2/1998 | Horton et al. | |
| 5,794,398 A | 8/1998 | Kaehler et al. | |
| 5,823,569 A * | 10/1998 | Scott | 280/781 |
| 5,944,130 A | 8/1999 | Sewell | |
| 6,098,739 A | 8/2000 | Anderson et al. | |
| 6,099,194 A | 8/2000 | Durand | |
| 6,108,907 A | 8/2000 | Anderson et al. | |
| 6,152,253 A | 11/2000 | Monaghan | |
| 6,205,665 B1 | 3/2001 | Anderson et al. | |
| 6,234,568 B1 | 5/2001 | Aoki | |
| 6,264,241 B1 | 7/2001 | Horiuchi | |
| 6,726,436 B2 | 4/2004 | Baumann et al. | |
| 6,757,958 B1 | 7/2004 | Baumann et al. | |

FOREIGN PATENT DOCUMENTS

| | | |
|---|---|---|
| EP | 0 867 566 | 9/1998 |

* cited by examiner

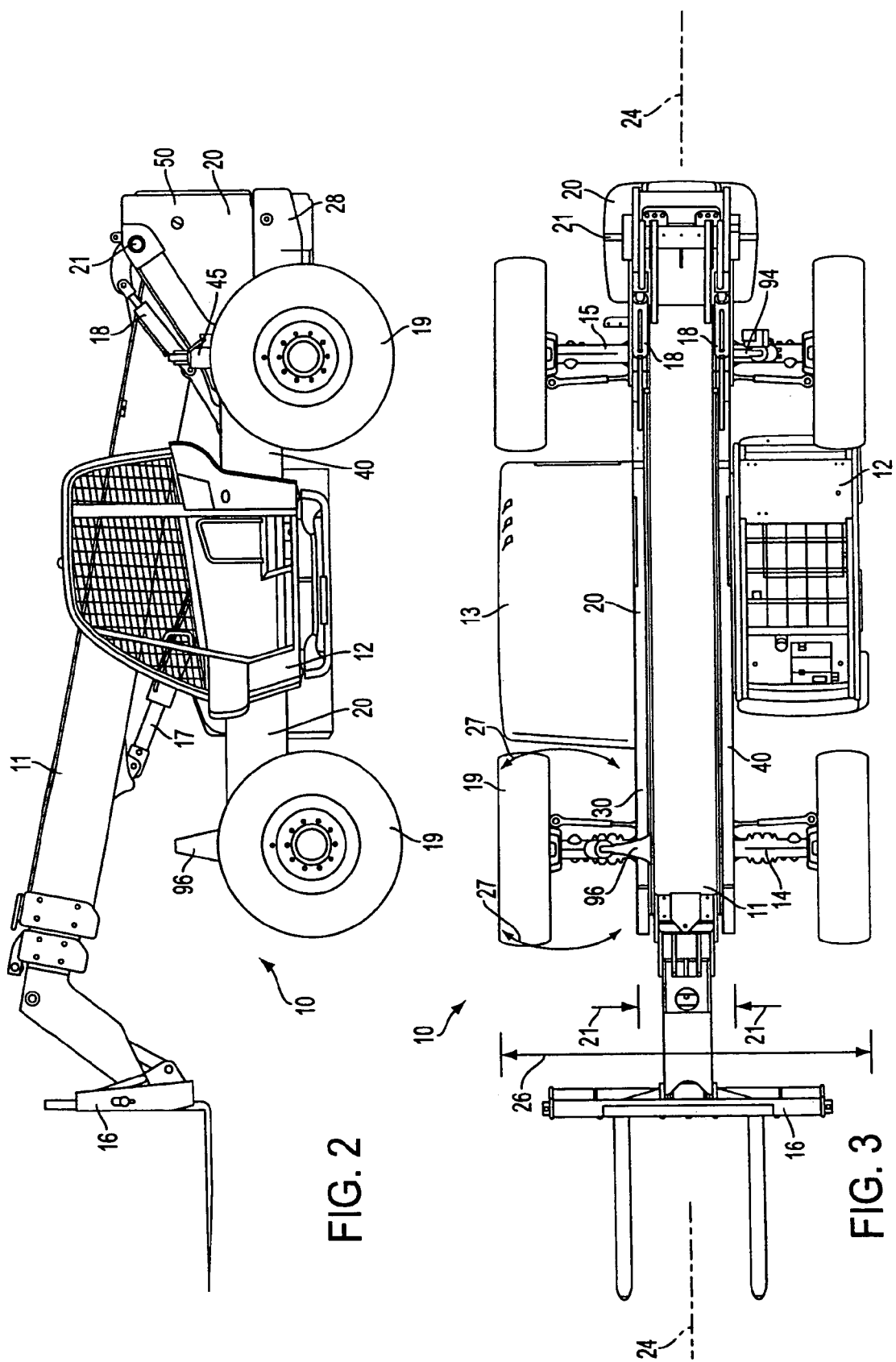

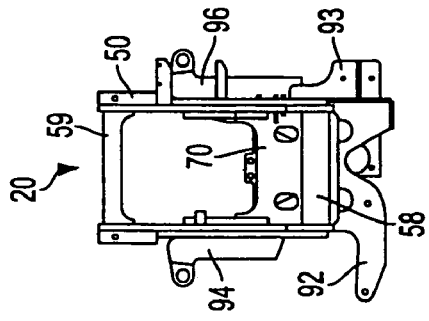
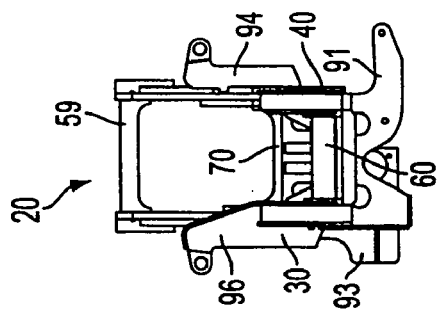
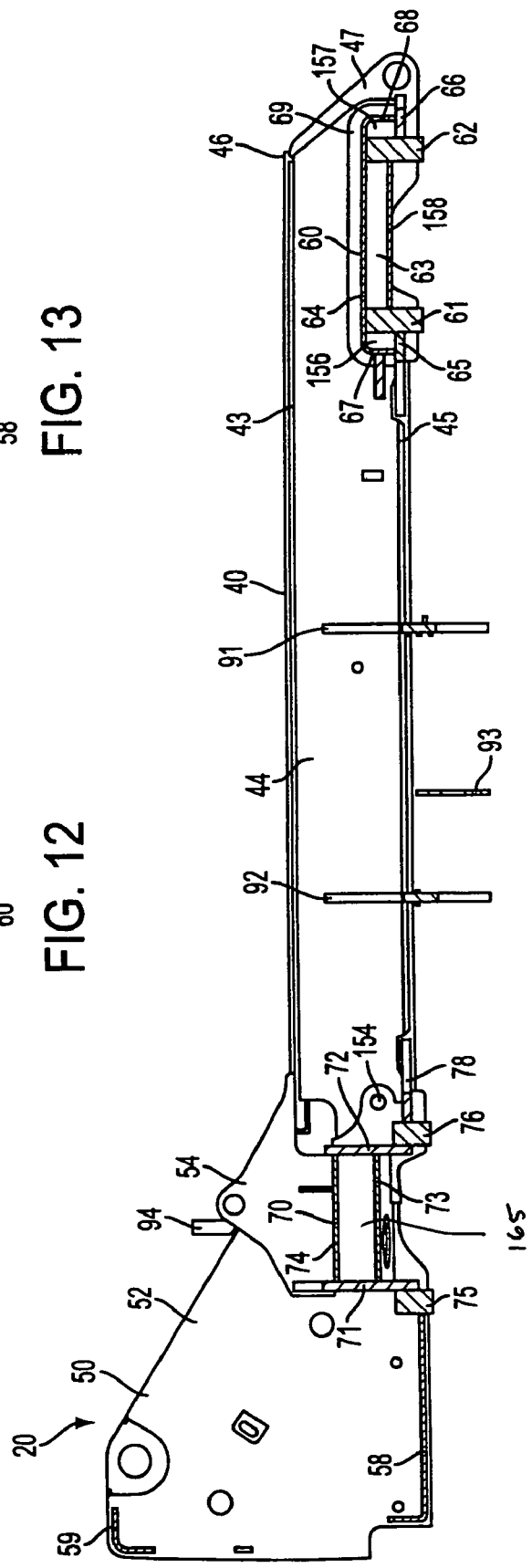

MODULAR FRAME LOAD HANDLER WITH TRANSLATABLE BOOM CARRIAGE

CROSS-REFERENCES TO RELATED APPLICATIONS

This application is a continuation of U.S. patent application Ser. No. 10/795,586, filed Mar. 9, 2004 now U.S. Pat. No. 7,182,369; which is a divisional of U.S. patent application Ser. No. 09/852,669, filed May 11, 2001, now U.S. Pat. No. 6,726,436; which is a continuation-in-part of U.S. patent application Ser. No. 09/568,798, filed May 11, 2000, now U.S. Pat. No. 6,757,958. The entirety of these applications are hereby incorporated by reference.

STATEMENT REGARDING FEDERALLY SPONSORED RESEARCH OR DEVELOPMENT (NOT APPLICABLE)

BACKGROUND OF THE INVENTION

The present invention relates generally to material handling equipment, including but not limited to mobile machinery of the type used for material handling jobs that require moving or positioning of a load. In particular, the present invention relates to a load handler with a modular frame and the manufacture and assembly of the frame and loader and components that may be used therein.

In construction jobs, it is desirable to lift heavy loads such as equipment, building materials, or earth, and to move, position or place the loads at other locations. This may require movement of a load high above and forward from the loader. Load handling vehicles, also referred to as loaders, loader vehicles or load handlers, employ pivoting booms that may be raised or lowered about a pivot point on the loader frame, and may be telescoped to move the load to the desired position. Attachments for the booms may be used for performing various jobs. For example, fork and bucket attachments may be used for moving materials like bricks or earth. Other attachments may be used for pouring concrete, handling roof trusses, boring holes in the earth, or other tasks.

The capability of loader vehicles is measured in some respects by how heavy a load it can lift and how high it can lift a load. For example, loaders may lift loads weighing up to twenty to sixty thousand pounds or more, to heights of up to twenty to one hundred feet or higher. The factors affecting the loader capability include, for example, the strength of the boom structure, the power of hydraulic cylinders for lifting and telescoping the boom, and the stability of the loader vehicle against tipping over. The stability depends on factors such as the weight of the loader vehicle, the positioning of the boom pivot point on the vehicle, the front to back and side to side spacing of the wheels, and the center of gravity of the load and vehicle.

In use, a load handling vehicle is subjected to tremendous stress forces resulting from the positioning of heavy loads at the end of the boom. These stress forces include twisting forces about the longitudinal axis of the frame of the vehicle. Depending on the work site conditions, the load handler may have to travel over or stand on uneven surfaces while carrying or positioning the load. This may increase the stress forces, such as due to leveling forces exerted by stabilizing hydraulic cylinders acting between the axles and the vehicle frame. Consequently, the vehicle frame may be subjected to compound bending and twisting stress forces due to the heavy loads and movement. The vehicle frame is desirably constructed with sufficient stiffness and torsion strength to withstand these forces without experiencing unacceptable deformation.

To achieve sufficient stiffness and torsion strength, frames for loader vehicles have been built using a box-shaped generally closed overall frame cross-section configuration. Although such a configuration provides good stiffness, the box shape may require that the boom pivot point be positioned relatively high. A relatively lower boom pivot point may be desirable to lower the center of gravity to increase stability of the vehicle. Some load handlers are configured to achieve a low boom pivot point by mounting the vehicle engine and operator cab to the sides of the vehicle with the boom nestled between them in the boom's lowered position. This configuration also provides a good field of vision for the operator in many uses of the load handler. However, to accommodate the lower boom position, the top of the box-shaped closed overall frame cross-section configuration may have to be opened up to an extent, thus adversely affecting stiffness and torsion strength. For example, such opened frames may lose stiffness and torsion strength particularly with respect to twisting forces along the vehicle front to rear longitudinal axis, with twisting occurring along the length of the frame's longitudinal structural beam members, or side rails.

In addition, the frames of load handling vehicles are commonly made in a unitary construction with components particularly designed for a particular vehicle capability. The frames are assembled using a "cell" type manufacturing process in which all the components for the frame of the vehicle are brought to a location and all the components are assembled at that location. Such an assembly process is relatively inefficient in that it requires dedicated floor space for extended periods of lead time during assembly.

BRIEF SUMMARY OF THE INVENTION

The present invention provides a load handling vehicle, a structural frame and method of assembly using modular components. A frame is provided that has a low pivot point for a boom that may be lowered to a position within the frame. The frame has left and right side rails, and front and rear cross rails, each having a closed cross-section construction. The side rails and cross rails are modular and the cross rails of a selected size are configured to fit a plurality of sizes of side rails, such that the same size cross rails may be used to construct a variety of sizes and capabilities of load handling vehicles in a flow type manufacturing process.

In one aspect, a structural beam is provided having plates interconnected along their lengths to form the beam having a box-shaped closed cross-section having a perimeter generally along the widths of the plates and forming a beam cavity within the perimeter. A first plate has a width greater than the width of an opposed second plate, and the plates are positioned to form a plurality of welding land inside corners along the length of the beam. A corresponding weld is formed simultaneously with a single pass at all of the welding land inside corners along the lengths thereof to interconnect the plates to form the structural beam.

In one aspect a motorized four-wheeled telescoping boom load handling vehicle has a modular longitudinally extending frame. The boom is pivotally secured to the carriage at one end and pivotally supports load handling means such as a fork carriage or crane hook or grapple, or the like, at the other end. Cylinders may be provided for elevating and lowering the boom relative to the carriage and for extending and retracting the boom segments. The various power means can be actuated selectively to extend and retract the boom and to raise and lower the boom.

In another aspect, the side rails include flanges that serve as tracks for forward and backward movement of the boom carriage.

In another aspect, a leveling system may be provided to maintain the frame level through all operating positions.

In another aspect, a frame is provided that has a low pivot point for a boom that may be lowered to a position within the frame. The frame includes closed section shaped side rails and cross rails. In another aspect of the invention, the frame is for a load handling vehicle.

In another aspect, a structural frame is provided having: a left side rail and a right side rail, each having a closed cross-section and a front end and a rear end; a front cross rail having a closed cross-section is rigidly affixed between the side rails at a forward location; and a rear cross rail having a closed cross-section is rigidly affixed between the side rails at a rearward location.

In another aspect, the structural frame side rails include: a first plate, a second plate, a third plate and a fourth plate; each of the plates having respectively a length, a width, and a thickness; the first and second plates being arranged in an opposed position to one another, and the second and third plates being arranged in an opposed position to one another; the plates being interconnected along their lengths to form the rail having a box-shaped cross-section having a perimeter generally along the widths of the plates and having a rail cavity within the perimeter; the first plate width being greater than the second plate width, and the plates are positioned with the widths of the third and fourth plates extending between, abutting and positioned generally traverse to the widths of the first and second plates, to form a plurality of welding land inside corners along the length of the side rails; a corresponding weld is formed at each of said welding land inside corners along the lengths thereof to interconnect the plates.

In another aspect, the frame is adapted for a load handling vehicle and the rails include the side rails of the vehicle.

In another aspect, the side rails and cross rails are modular and the cross rails of a selected size are configured to fit a plurality of sizes of side rails, such that the same size cross rails may be used to construct a variety sizes and capabilities of load handling vehicles.

In another aspect a method for manufacturing a structural frame apparatus is provided including the steps of: assembling modular components of a frame; stocking the components for later use; selecting a capability for a frame; choosing the modular components for configuring the selected frame; retrieving from stock components for a subassembly of a frame; assembling the components for the selected subassembly; and if the product assembly is not completed, moving the product to the next assembly station and returning to and repeating the step of retrieving components for another subassembly and continuing the process until the frame assembly is completed.

In another aspect, the subassembly made by such method is a frame for a load handling vehicle.

In another aspect a structural beam is provided having a first plate, a second plate, a third plate and a fourth plate, each plate having respectively a length, a width, and a thickness, the first and second plates arranged in an opposed position to one another, the second and third plates arranged in an opposed position to one another, and the plates interconnected along their lengths to form the beam having a box-shaped closed cross-section having a perimeter generally along the widths of the plates and forming a beam cavity within the perimeter. The first plate width is greater than the second plate width, and the plates are positioned with the widths of the third and fourth plates extending between, abutting and positioned generally traverse to the widths of the first and second plates, to form a plurality of welding land inside corners along the length of the beam. A corresponding weld is formed at each of the welding land inside corners along the lengths thereof to interconnect the plates to form the structural beam.

In another aspect, a method for manufacturing a structural beam is provided including the steps of providing a first plate, a second plate, a third plate and a fourth plate. Each of said plates has respectively a length, a width, and a thickness. The first plate width is greater than the second plate width. The first and second plates are arranged in an opposed position to one another, and the second and third plates being arranged in an opposed position to one another, such that the plates are positioned with the widths of the third and fourth plates extending between, abutting and positioned generally traverse to the widths of said first and second plates, to form a plurality of welding land inside corners along the length of the beam. A corresponding weld is simultaneously formed at all of the welding land inside corners along the lengths thereof to interconnect the plates along their lengths to form the beam having a box-shaped closed cross-section, a perimeter generally along the widths of the plates, and a beam cavity within said perimeter.

These and other features and advantages of the invention will be more clearly understood from the following detailed description and drawings of preferred embodiments of the present invention.

BRIEF DESCRIPTION OF THE DRAWINGS

These and other aspects and advantages of the present invention will be described in detail with reference to the accompanying drawings, in which:

FIG. 2 is a left-side elevation view of the load handler of FIG. 1.

FIG. 3 is a top plan view of the load handler of FIG. 1.

FIG. 12 is a front elevation view of the frame of FIG. 4.

FIG. 13 is a rear elevation view of the frame of FIG. 4.

FIG. 14 is a view taken along section line XIV-XIV of FIG. 10.

DETAILED DESCRIPTION OF THE INVENTION

Figure 1:
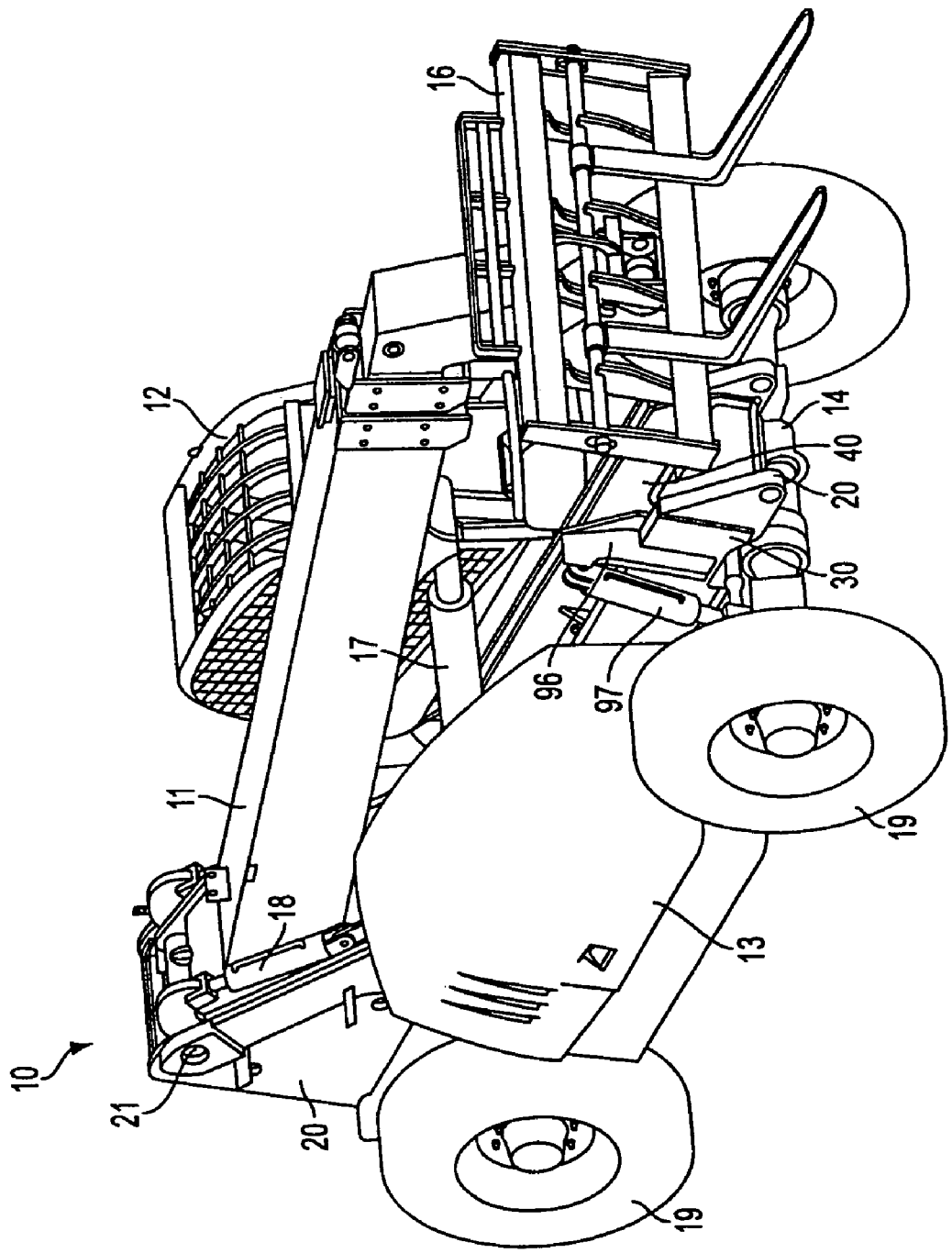
FIG. 1 is a perspective view of a load handler according to a preferred embodiment of the present invention.

Refer now to FIGS. 1 through 3, there being shown a load handler, generally designated by reference numeral 10, according to a preferred embodiment of the present invention. The load handler 10 includes a vehicle frame 20 supported on front and rear axles 14 and 15 equipped with front and rear tires and wheels 19. A load handling device such as a fork carriage 16 is pivotally supported at one end of an elongated telescoping boom 11 of generally rectangular cross section. The fork carriage 16 may be replaced by a crane hook (not shown) or other load handling attachment, depending upon the work to be performed by the load handler 10.

Figure 5:
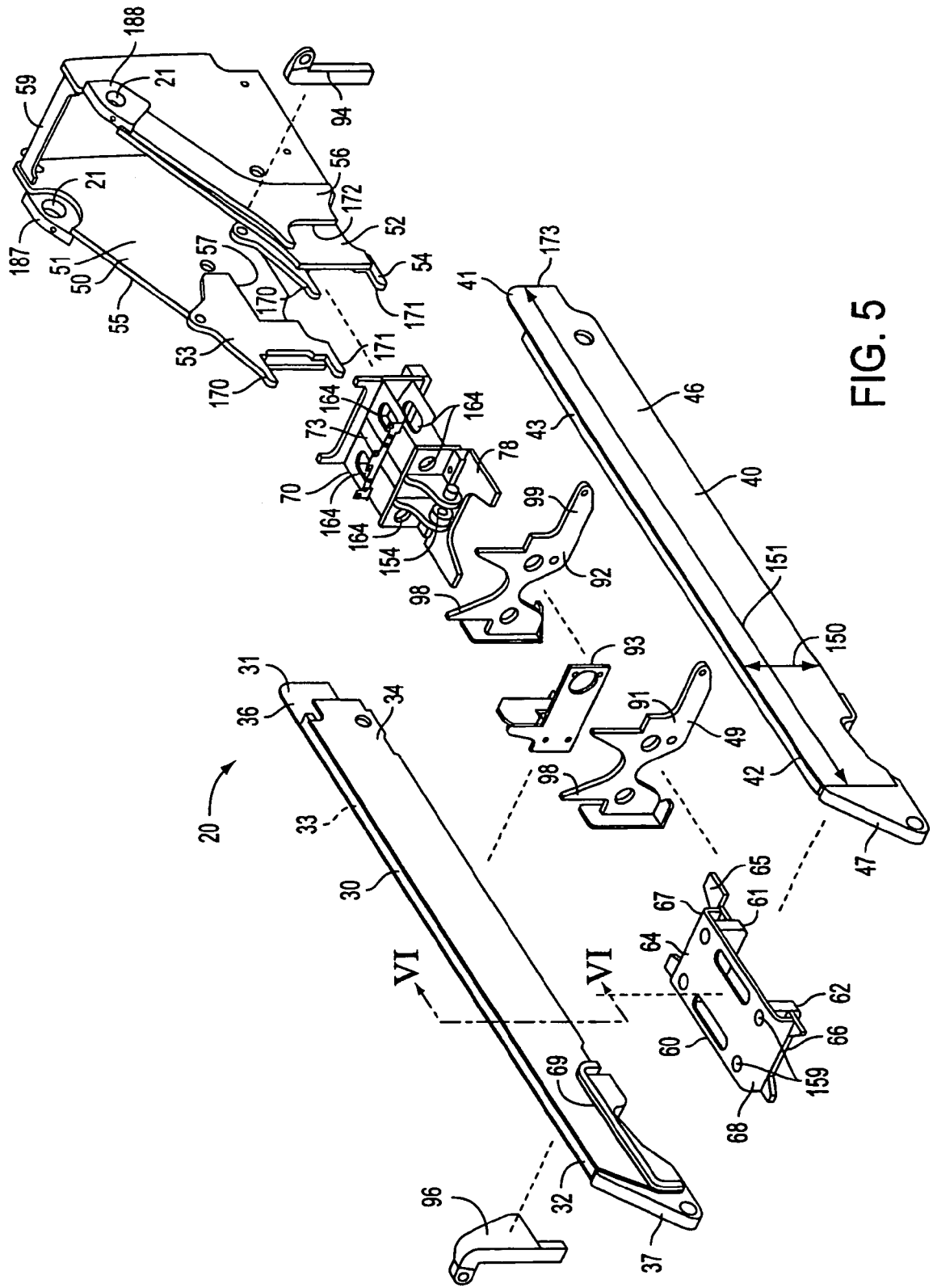
FIG. 5 is an exploded perspective view like FIG. 4.

In the illustrated embodiment, the vehicle 10 is configured with the operator cab 12 positioned on the left side of the frame 20 and the engine 13 mounted on the right side of the frame 20. The frame 20 provides a low pivot axis 21 for the boom 11. The boom 11 may be lowered to lie nestled between the cab 12 and the engine 13 and within the structural members of the frame 20, generally along the direction of the longitudinal axis 24 of the frame and vehicle. The boom 11 is raised and lowered using a boom primary cylinder 17 attached to pivot at one end at the boom 11 and at the other end at the frame 20 at mount 154 (FIG. 5). The boom secondary cylinders 18 also aid in raising and lowering the boom 11. Additional hydraulic cylinder structure is positioned on the boom for telescoping the boom sections in and out.

The front and rear wheels 19 pivot at their connections to the front axle 14 and the rear axle 15 for turning the vehicle. The front axle 14 and the rear axle 15 are each mounted to rotate or tilt to some extent with respect to the vehicle about the longitudinal axis 24 to accommodate uneven terrain while maintaining the boom and load in a more vertical position. The tilting of the axles 14 and 15 is controlled respectively by a front axle hydraulic cylinder 97 and a rear axle hydraulic cylinder 95. The front axle hydraulic cylinder 97 is connected at one end to pivot at the axle 14 and at the other end to pivot at a front tilt tower 97 of the frame 20. The rear axle hydraulic cylinder 95 is connected at one end to pivot at the rear axle 15 and at its other end to pivot at the rear stabilizing tower 94 of the frame 20. It can be seen that on uneven ground the action of these hydraulic cylinders to stabilize and to keep the frame in a more horizontal position about its longitudinal axis 24 incurs twisting stress forces on the frame 20. Particularly note that the primary boom hydraulic cylinder 17 is positioned below the boom 11 and, along with a portion of the boom 11, is received within the frame 20 between a frame left side rail 40 and a frame right side rail 30 which are described in more detail below.

Note particularly with respect to FIG. 3, that the overall width 26 of the vehicle 10 is limited by transportability restrictions, such as, for example, the width restrictions of trailers or cargo transporting containers for hauling the loader, and the width of the lanes of roads on which the loader may be driven. Accordingly, the wheels 19 may only be positioned outwardly from the frame 20 a limited distance. The clearance between the wheels and tires 19 and the overall width 21 of the frame 20 and the proximity of the wheels 19 will limit the extent of the arc 27 through which the wheels 19 may be turned. This will limit the turning radius of the vehicle 10. A shorter or tighter turning radius may be more desirable in many uses because the vehicle may have a limited area for maneuvering. To achieve a shorter turning radius, the wheels 19 should be turnable over a greater angle, i.e., over a larger arc 27. This may be achieved by providing more clearance space between the wheels 19 and the frame 20. Because the outer extent 26 of the wheels 19 are limited, such as by the transportation restrictions as discussed above, to achieve a greater arc 27 it is desirable to narrow the overall width 21 of the frame 20. The frame 20 according to a preferred embodiment of the present invention provides a relatively narrow width 21 while achieving desired stiffness and torsional strength properties for the frame 20.

The boom pivot point 21 is provided at a low position at the rear module 50 of the frame 20. The low mounting of the boom and the overall balance of the design of die vehicles 10 achieve a low center of mass and allows the elimination of the use of hydrofill in the tires 19 for ballast weight. In the event a higher boom position is desired, the boom 11 can be fitted with its corresponding pivot (that mates with pivot 21) at a more downward position. A ballast weight 28 may be conveniently attached to the rear module 50 for adding overall weight to the vehicle for balancing the load and lowering the center of gravity of the vehicle and load.

Refer now to FIGS. 4 and 5 and 8 through 16 that illustrate a frame for a load handling vehicle according to a preferred embodiment of the present invention. The frame is generally designated by reference numeral 20. The frame 20 includes a right side rail 30 and a left side rail 40. The side rails or beams 30 and 40 have a generally closed cross section to achieve desired stiffness and torsion strength. In the illustrated embodiment, the closed section is box shaped. The side rails 30 and 40 are connected together at a forward location 23 by a front axle mount pod 60, and at a rearward location 24 by a rear module 50 and a rear axle mount pod 70. The front axle mount pod 60 and the rear axle mount pod 70 are each also formed using closed section type construction for achieving stiffness and torsion strength. The assembled frame 20, as well as its components, utilize closed sections to enhance stiffness and torsion strength of the components and the overall frame construction. For example, the left and right rails 30 and 40 joined with the axle mount pods 60 and 70 and the rear module 50 form a closed section in which the bulkhead frames 91 and 92 extend. Moreover the addition of the bulkhead frames 91 and 92 add to the closed section construction and to the stiffness and torsion strength, including with respect to twisting motion about the longitudinal axis 24.

The front axle mount pod 60 provides a mounting position for the front axle 14. The pod 60 is desirably stiff to support the axle 14 and withstand torquing, bending, twisting, and compound loading forces exerted by the axle 14. Pod 60 is modularly configured to accept a range of sizes of axles. The front axle mount pod 60 is also a structural frame cross rail or beam positioned to extend between the side rails or beams 30 and 40 at a forward location 23. In the illustrated embodiment, the forward location 23 is proximate the front ends 32 and 42 respectively of the side rails 30 and 40, however the forward location 23 could be selected at a more rearward location. The front axle mount pod 60 is constructed to form two closed sections 156 and 157 extending along its length, which extends along the width 21 of the frame 20 between the side rails 30 and 40. The front axle mount pod 60 includes a main upper plate 64, having a downwardly extending front arm 68 and a downwardly extending rear arm 67. Heavy solid bars 61 and 62 extend along the length of the pod 60 generally parallel with, but spaced from, the arms 67 and 68, and are attached under and to the plate 64. The axle 14 may be bolted to the bars 61 and 62, such as through bolt holes 159. A front lower plate 66 is attached to the front bar 62 and the front arm 68 to form the front closed section 157. A rear lower plate 65 is attached to the rear bar 61 and the rear arm 67 to form the rear closed section 156. A triangular closed section 63 (FIGS. 14 and 15) is formed by angle element 158 attached to the under surface of the main upper plate 64 and extends between and is attached to the bars 61 and 62. The boom 11 in its lowered position may rest on the plate 64 of the front axle mount pod 60, and elastomeric or other cushioning or wear surface supports may be provided between the boom 11 and plate 64.

The rear axle mount pod 70 provides a mounting position for the rear axle 15. The rear axle mount pod 70 is also a structural frame cross rail or beam positioned to extend between the side rails or beams 30 and 40 at a rearward location 24. In the illustrated embodiment, the rearward location 24 is proximate the rear ends 31 and 41 respectively of the side rails 30 and 40, however the rearward location 24 could be selected at a m re forward or rearward location. The rear axle mount pod 70 is constructed to form a closed section 165 extending along its length, which extends along the width 21 of the frame 20 between the side rails 30 and 40 and between the plates 53 and 54 of the rear module 50. The rear axle mount pod 70 includes a front plate 72 and a rear plate 71. Heavy solid bars 75 and 76 extend along the length of the pod 70 generally parallel with the plates 71 and 72, and are attached outside of and to the plates 71 and 72 respectively. The axle 15 may be bolted to the bars 75 and 76 such as through bolt holes 159. A front lower plate 78 is attached to the front bar 76 and the pivot. A mount 154 for cylinder 17 is attached to the plates 72 and 78 and the bar 76. The closed section 165 includes a left section 73, a right section 77 and a center section 74. The left section 73 includes a top plate 160 and a bottom plate 161 extending between and attached to the plates 71 and 72 and attached to the section 74. The center closed section 74 is tubular and extends between and is attached to plates 71 and 72. The right section 77 includes a top plate 162 and a bottom plate 163 extending between and attached to the plates 71 and 72 and attached to the section 74. Upon assembly of the rear axle mount pod 70 to the rear module 50, the sections 73 and 77 extend to and are attached to the rear module 50. The apertures 164 are formed to accommodate hydraulic hose and provides other access, as well as to strengthen the plates 71 and 72.

The rear module 50 includes a rear module right main plate 51 and a rear module left main plate 52 extending generally parallel with the axis 24 and connected together by a rear module upper support 59 and a rear module lower support 58 extending across the width 21 of the frame 20 and attached to the rear module main plates 51 and 52. Attached to the inside front surfaces of the plates 51 and 52 are a rear module right slave ear plate 53 and a rear module left slave ear plate 54 respectively. The ear plates 53 and 54 include upper and lower projections 170 and 171 respectively to form a C-shaped recess for accepting and engaging the upper plates 33 and 43 and the lower plates 35 and 45 of the side rails 30 and 40 respectively. A strong C-shaped weld may be formed at the intersection for joining the rails 30 and 40 and the module 50. The rear module 50 further includes a rear module right side plate 55 and a rear module left side plate 56 attached to the outer surfaces of the plates 51 and 52 respectively. Reinforced lugs 187 and 188 are provided at the rear ends of the plates 55 and 56 for defining the pivot point 21 of the boom 11.

Note that the forward ends 172 of the plates 55 and 56 are contoured to abut, or come close to abutting and mate with the portions 173 of the rear ends 31 and 34 of the side rails 30 and 40 respectively. Also the rear ends of the plates 34 and 44 and the widths of the plates 33, 43, 35 and 45 are chosen to allow the plates 34 and 44 to overlap the inside surfaces of the rear module plates 53 and 54 for attachment thereto. This plate construction of modular components provides for an overlapping and strong joint of side rails 30 and 40 and the rear module 50. The various sizes of the various components of module 50 may be modified to accommodate different size rails 30 and 40 for different capacities of vehicle 10 as well as accommodate different size booms. Accordingly, a number of the components may be reused for various sizes and capabilities and configurations of vehicles tailor-made to a product order in an efficient flow type manufacturing process. The rear stabilizing tower 94 is welded to the rear module left side plate 56. Note also that in the rear module 50 as well as in other features of the frame 20, feathered contours such as leading to the ears 170 are utilized to provide strength and transition of forces through the flame. In addition, various apertures, such as aperture 164 are provided in components to allow accessibility for maintenance, routing of lines such as hydraulic lines and for strengthened the plate components. The plate 53 is provided with an under edge 57, that is sized to accept the top and the front of the rear module 70. Also the bottom of the ears 171 lay on the top surface of the plate 78 of the rear module 70 and may be welded thereto.

The left and right side rails are constructed in similar fashion by the welding together of four plates as described in more detail below with reference to FIG. 6. The right side rail 30 includes a right side rail upper wall plate 33 and a right side rail lower wall plate 35 (FIG. 6).

The forward bulkhead frame 91 and the rear bulkhead frame 92 are welded to the inside surfaces of the side rails 30 and 40 and have portions 99 extending to the left side of the frame 20 to support the cab 12. The bulkhead frames 91 and 92 each have upper recesses 98 sized to accommodate the hydraulic cylinder 17 and boom 11 in its lowered position. A transfer box mount 93 is also welded between the rails 30 and 40 for mounting a transfer box in the drive train of the vehicle 10 for transmitting power from the engine to the front and rear axles 14 and 15. The front tilt tower 96 is mounted to the right side rail 30 proximate the location of the front axle mount pod 60. The rear stabilizing tower 94 is welded to the rear module 50. The right side rail 30 includes a right side rail inner wall 34 and a right side rail outer wall 36. The inner wall 34 and the outer wall 36 are connected together with a right side rail upper wall 33 and right side rail lower wall 35 to form a generally box shaped closed cross section, as described further with reference to FIG. 6. At the right side rail front end 32 a right side rail plug or shoe 37 is inserted into the cavity 38. The plugs or shoes 37 and 47 are shaped and sized to accommodate the axle 14 and to provide desired ballast weight to the front end of the vehicle 10. The holes 155 are provided on the plugs 37 and 47 for towing and handling of the frame and vehicle during assembly and transport. The plugs 37 and 47 and holes 155 may also be used for mounting accessories to the vehicle 10, such as, for example, outriggers used for providing additional stabilizing support. The shape of the plug 37 desirably forms a suitably sized reinforced closed cross-section support for the front tilt tower 96. The front tilt tower 96 has a recess 156 for accepting an edge of wall plate 36 and a lip 157 for engaging the edge 104 of the wall plate 33, while the front tilt tower abuts the plates 33 and 36 along a desired extent for welding. The recess 156 and lip 157 to some extent support and align the front tilt tower 96 while it is attached to the side rail 30.

Upon assembly of the various components of the frame 20, the side rail cavities 38 and 48 (FIG. 15) are sealed and may be used to function as gas pressure relief tanks in connection with the hydraulic fluid system for the various hydraulic cylinders of the vehicle 10.

Figure 6:
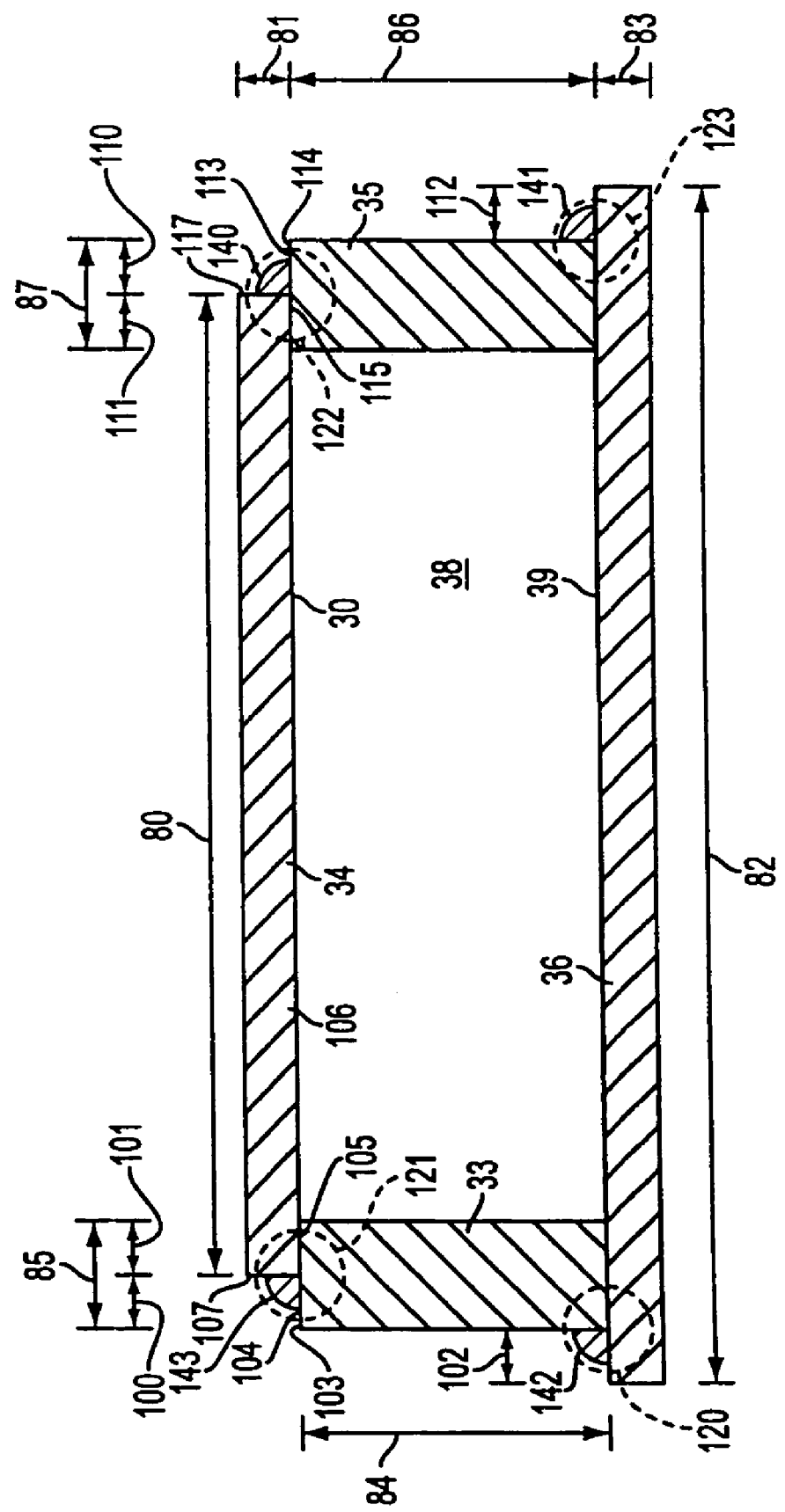
FIG. 6 is a view taken along section line VI-VI of FIG. 5.

Refer now to FIG. 6, which illustrates a cross section of the right side rail or beam 30 of the described embodiment. The left side rail 40 is constructed in a similar fashion. The right side rail 30 is oriented in FIG. 6 with its outer wall 36 at the bottom of FIG. 6 to aid in discussion of the method of assembly of the side rail 30. The side rail 30 has generally a closed cross section with a cavity 38 formed by the various walls which define a perimeter of the beam 30, the inside perimeter being designated by reference numeral 39. The lower wall plate 35 has a width 86 and a thickness 87. The walls 33, 34, 35 and 36 also have respective lengths in the direction of the longitudinal axis 24 of the vehicle. The overall length 151 (FIG. 5) of the rails or beams 30 and 40 may be longer than the length of one or more of the walls of the beams. The right side rail upper wall 33 has a width 84 and a thickness 85. The right side rail outer plate or wall 36 has a width 82 and a thickness 83. The right side rail inner wall or plate 34 has a width 80 and a thickness 81. The thicknesses generally extend across the edges of the plates.

Note that in the illustrated embodiment the width 80 of the right side rail inner plate 34 is a shorter than the width 82 of the right side rail outer plate 36. The width 80 and 82 are chosen, along with the thicknesses 85 and 87 of the upper and lower wall plates respectively, in achieving a welded construction with desired stiffness and torsion strength. As shown in FIG. 6 the walls or plates 33 and 35 are positioned over the outer right side rail wall or plate 36 set back by distances 102 and 112 respectively, to form inside welding corners for effecting the welds 141 and 142. These welding corners are in the regions of the dash line circles designated 120 and 123. Similarly, the plate or wall 34 is positioned with respect to the thickness of the plates 33 and 35 to form welding inside corners for effecting welds 143 and 140 in the regions 121 and 122. Although the welding regions are identified by the circles, they are not limited to within that circle, but, rather, the circle designates the general region of the welding inside corner. Typical welds may be about five sixteenths of an inch or as desired. Also, although the welds 14, 142, 143 and 144 are shown as beads in cross section and just residing in the corner, as materials are welded together, they fuse together and that fusion extends below the surfaces of the materials. That fusion is not shown in FIG. 6 for clarity of understanding of discussion of the overlap of the various dimensions of the plates or walls 33, 34, 35 and 36. Note that the inside weld corners 120, 121, 122 and 123 extend generally along the length of the right side rail 30. Because of the requirements for the frame right side rail, all of the walls 33, 34, 35 and 36 may not have the same length or may have interruptions in their length to accommodate their particular requirements for the purpose for which the side rail is used. In the illustrated embodiment, such purpose is the construction of a frame for a load handling vehicle. In one aspect, the rail or beam construction described herein may be used as shown in the illustrated embodiment, or modified, for purposes other than for the described frame and vehicle embodiments.

The inside welding corner 120 has a dimension 102 defined by the positioning or abutting of a non-edge surface of the wall 33 with respect to a non-edge surface of the wall 36 and opens up and to the left of FIG. 6. Similarly, the inside welding corner 123 has a dimension 112 defined by the positioning or abutting of a non-edge surface of the wall 35 with respect to a non-edge surface of the wall 36 and opens up and to the right of FIG. 6. The inside welding corner 121 has a dimension 100 corresponding to the positioning or abutting of an edge surface of the wall 34 with respect to an edge surface of the wall 33 and opens up and to the left of FIG. 6. Similarly the inside welding corner 122 has a dimension 110 that is determined by the positioning or abutting of an edge surface of the wall 34 with respect to an edge surface of the wall 35 and opens up and to the right of FIG. 6. All of the welding corners open in an approximately common direction of upwards, or from the plate 36 towards the plate 34, in the illustrated embodiment. The inside corner 121 and the inside corner 122 each have a dimension 81 corresponding to the thickness of the plate 34. The dimensions 81, 110, 100, 102 and 112 are chosen to give sufficient welding inside corner surface area to effect the welds 140, 141, 142 and 143. The thicknesses 81 and 83 are also chosen considering the desired stiffness of the overall beam or rail 30. Similarly the thicknesses of the plates 33 and 35 are chosen to provide not only the sufficient inside corner surfaces or lands 104 and 114, but also sufficient overlaps 105 and 115, having dimension 101 and 111 with the inside surface 106 of plate 34. Also it may be desirable to maintain the ratio of dimension 100 to the dimension 101 as well as the ratio of the dimension 110 to the dimension 111 equal to a greater than one to one, because of lower ratios, as the dimensions 100 and 110 become relatively smaller, the beam 30 may tend to spread apart somewhat because of heat expansion.

Generally the thicknesses of the plates or walls 33 and 35 will be thicker than the plates or walls 34 and 36. If the thickness of the walls 33 and 35 are sufficiently high, splitting or fracture of the material of plates 33 and 35 may be experienced during welding, for some materials. When using steel, this splitting may be alleviated to an extent by using cold rolled bars preformed flats or cold finished flats, for the thicker plates 33 and 35, which bars or flats have not been cut with heat prior to the welding process. The cutting of the bars with heat may weaken them and make them more susceptible to the splitting during the welding process. It is desirable that a sufficiently smooth surface be present on the inside welding corners such as on edges 103 and 113 of bars or plates 33 and 35 respectively and the edges 107 and 117 of the plate 34. A "125" edge finish (sometimes referred to as a microfinish) or smoother has been found acceptable, however, rougher or smoother finishes may be acceptable for various applications. With the construction shown, the thicknesses 83 and 81 of the plates 34 and 36 may be small enough so that the plates may be cut and shaped for fitting into the vehicle frame 20 or other application of the beam 30, without experiencing the splitting effect upon welding. For example, a one and one-half inch thick steel plate may not experience the splitting effect upon welding, whereas a one-half inch thick steel plate may. This may vary with the steel alloy and quality.

Also as shown in FIG. 6 the inside welding corners 120, 121, 122 and 123 all open towards the top of the figure. This is beneficial in the manufacturing process so that the entire beam or rail 30 may be welded in a single pass using an automated welding machine, such as a Peck welding machine with four welding guns. Thus, the beam may be positioned and oriented as shown in FIG. 6 with the plate 36 resting on the table of the welding machine and all four of the welds 140, 141, 142 and 143 effected simultaneously with a single pass of the welding machine over the beam 30. The respective welds may be continuous unless a break is desired because of the contours of the plates, or otherwise. This has been found to provide a highly stiff structural beam 30 in an efficient process. Also, the components of the beam may be modified to make modular components for the frame construction. Particularly the widths 80 and 82 of the plates 34 and 36 respectively may be adjusted to increase the stiffness of the beam particularly in the direction of the widths. This corresponds to the vertical direction and rail height 159 as shown in FIG. 5 of the illustrated embodiment of the vehicle 10. Thus, the widths and the lengths as well as thickness of the component parts of the beam 30 as well as beam 40 may be conveniently changed to accommodate different load capacities to torsion strength and stiffness for the beams as well as for the frame 20 and the vehicle 10 of the illustrated embodiment.

Upon assembly of the beam 30 with such welding technique and with the plate 36 being wider than plate 34 (a so called "top hat" configuration), it has been found that the beam along its length may experience a slight sweep or bow (FIG. 10) with the wider plate 36 on the outside of the curvature. This may be desirable for assembling the frame 20 as described in more detail below. The side rail 40 is constructed in a manner similar to the side rail 30.

Figure 7:
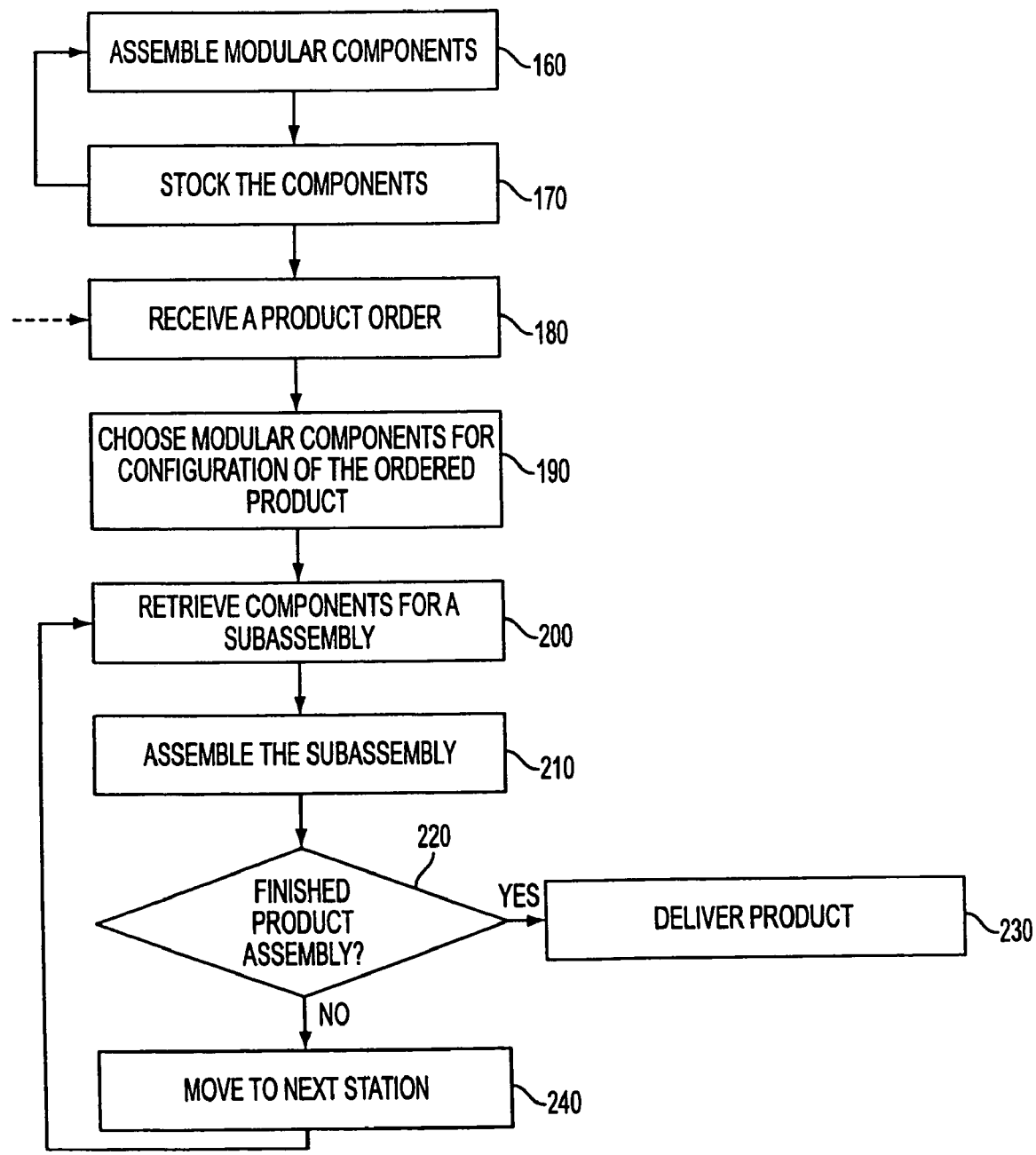
FIG. 7 is a flow chart illustrating a method of assembly according to a preferred embodiment of the present invention.
Figure 8:
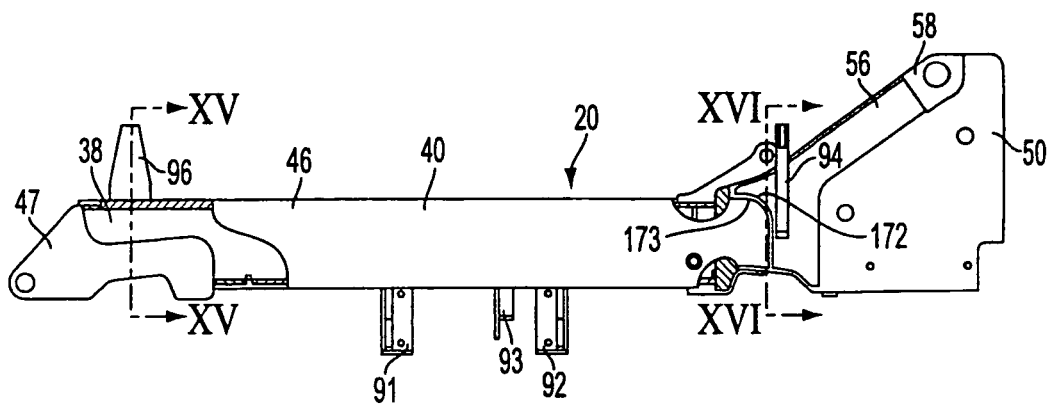
FIG. 8 is a left side elevation view of the frame of FIG. 4.
Figure 9:
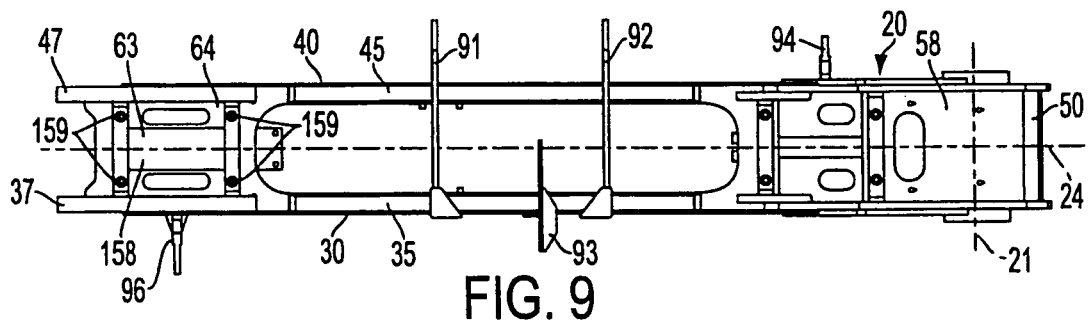
FIG. 9 is a bottom plan view of the frame of FIG. 4.

Refer now to FIG. 7 which shows a flowchart illustrating an assembly method according to a preferred embodiment of the present invention. The assembly method is for assembly a product from modular components. Each modular component is assembled in step 160. Then the modular components may be stocked in step 170 for later use. The steps 160 and 170 may be repeated continuously until sufficient stock is obtained and can be also repeated while the balance of the assembly process is taking place. For efficient production in flow manufacturing it is desirable to minimize stock theoretically to the point that components are ready just in time for use. The use of modular components that may be used in multiple vehicle configurations means less different part designs are used and thus allows stock quantities to be reduced. Once a product order is received in step 180 or otherwise it is decided that a product will be built, then the modular components for the configuration of the ordered product are chosen in step 190. The modular components are then retrieved for building a subassembly of the product in step 200. In step 210 the subassembly is assembled. In step 220 it is determined whether upon assembly of that subassembly the product is finished. If so, then the product is delivered or otherwise disposed of at step 230. If the product does not have subassemblies but is made of a single assembly from the modular components, then this is the end of the process. However, if there is more than one subassembly, then the product may be moved to the next station in step 240. The next station may be at another location down the manufacturing line or if desired may be in the same physical location. Then the step 200 is repeated, retrieving components for another subassembly which is then assembled with the previously assembled subassembly or subassemblies. This process is continued until the product is finished.

With respect to the particular frame embodiment and loader vehicle embodiment illustrated in the figures, the process illustrated by FIG. 7 may be as follows. With respect to the frame, each of the components of the frame, including the plates of the side rails, the component parts of the front axle mount pod 60, the rear axle mount pod 70 as well as the rear module 50 may be procured and the plates cut and stocked.

If it is desired to manufacture any particular side rail as the product, such as the side rail 30, as the product to be stored for later use, the plates 33, 34, 35 and 36 may be obtained and, in the case of side plates 34 and 36, cut to shape. The walls may then be welded together as described above with reference to FIG. 6 and the product is finished. The product may then be stored for later use as a component of another product.

If the product is the frame, then the component parts are chosen and assembled in steps 160 and 170. For a given capability of a load handling vehicle in step 180, a frame 20 may require predetermined size side rails 30 and 34 and other components in step 190. Other rail sizes may be determined by the rail height 150 and length 151 as well as other parameters. These rails are retrieved in step 200 from storage along with the other component parts such as the module 50, the pods 60 and 70 and the parts 91, 92 and 9. The component parts may then be mounted on a fixture and welded. For the frame illustrated in FIG. 5, the rear axle mount pod 70 may first be welded to the rear module 50. Then the side rails 30 and 40 are mounted on the fixture along with the rest of the components.

Figure 10:
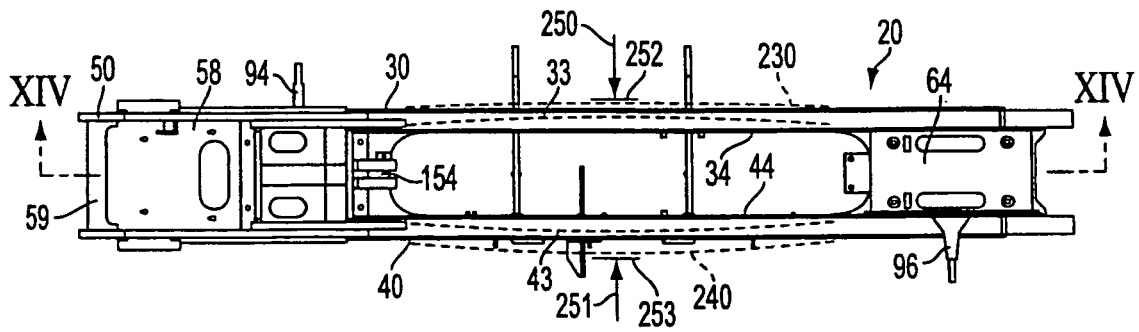
FIG. 10 is a top plan view of the frame of FIG. 4.
Figure 11:
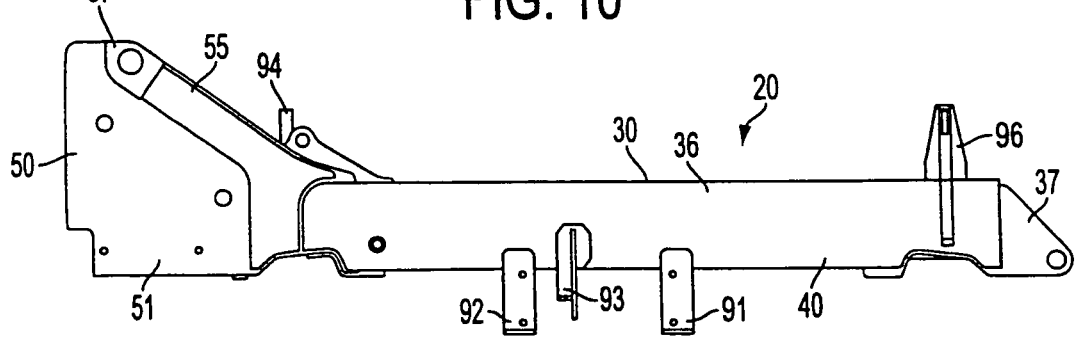
FIG. 11 is a right side elevation view of the frame of FIG. 4.
Figure 16:
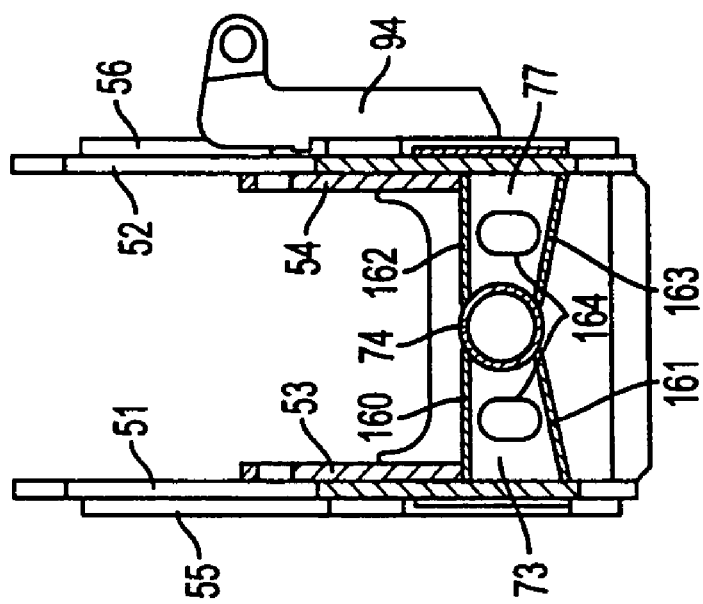
FIG. 16 is a view taken along section line XVI-XVI of FIG. 8.
Figure 15:
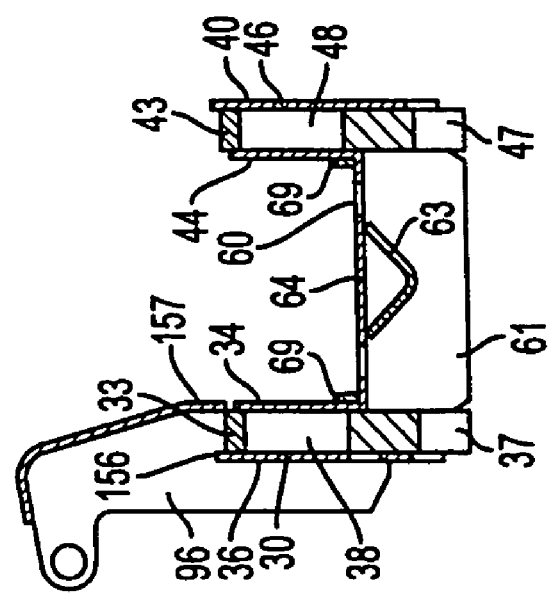
FIG. 15 is a view taken along section line XV-XV of FIG. 8.

As discussed above, the side rails 30 and 40 constructed according to the embodiment illustrated in FIG. 6 may have a slight outward sweep or bow. FIG. 10 shows schematically the rails in the bowed position 230 and 240 designated by dotted lines. This may facilitate assembly as it allows some space to position, or drop into place, the component parts, particularly the bulkhead frames 91 and 92 and transfer box mount 93. The frames may be then compressed together with fixture 252 and 253 in directions of 250 and 251 at their middles to bring the component parts into contact and the rear bulkhead 50 positioned at the rear ends 31 and 41 of the rails 30 and 40. With the component parts 30, 40, 60, 91, 92 and 93 held in position in a fixture, then the welds may be effected to join such components together. Note that the front pod 60 auxiliary strip 69 at this point may be positioned at the corner of the front axle mount pod 60 and the wall 34 for strength and welding. Then the module 50 and rear pod 70 may be pushed onto the balance of the frame and welded in position. Note also that the welding of the bulkhead frames 91 and 92 and the transfer box mount 93 add stiffness and torsion strength to the frame 20 and the vehicle 10.

If the product is a vehicle, the process can be configured to add the engine cab, axles, wheels and other components in a flow manufacturing process.

As a feature of the illustrated embodiment, different sizes of rails 30 and 40 may be used with a single set of sizes of the other components. This will yield a range of capacity of load handling vehicles using similar parts and a modular construction. Also the other parts may be modified to accommodate various cab designs, axle designs and boom arrangements, while reusing a number of the other component parts as desired. This modular construction in a more efficient flow type construction process is more efficient than the cell type construction process typical for load handling vehicles. This construction provides a highly stiff frame with a relatively narrow width allowing for an enhanced turning radius for the vehicle.

The straight rails as shown in the illustrated embodiments will generally be more economical to manufacture than angled rails that may have a varying height 150 along their length 151 because of lower cost of straight wall plates and easier alignment in welding of the plates. However, the present invention is not limited to straight rails or beams, or straight plates used in their construction. Indeed, it may be desirable to use such angled rails having a tapering or varying width in some applications.

The rails will generally become stiffer as the rail height 150 increases. For example, for a loader vehicle 10 constructed according to the illustrated embodiments, a lifting capability of about sixty six hundred pounds and a gross vehicle weight of about thirty thousand pounds may be achieved with a rail length 151 of about one hundred thirty one inches and a rail height 150 of about fourteen inches. By increasing the rail height 150 to about sixteen inches, a capability of lifting about eleven thousand pounds and a gross vehicle weight of about forty thousand pounds may be achieved. The capability may be increased to a gross vehicle weight of about fifty thousand pounds by increasing the rail height to about nineteen inches, even when the rail length is increased to about one hundred thirty-six inches. The lifting capability is also affected by the degree of extension of the boom and its angle to horizontal. Load charts are commonly employed by vehicle operators to determine lifting capability for various conditions. Essentially all the other major components, such as the pods 60 and 70 and the module 50, may be used in all three vehicle set-ups. Some components however may change somewhat, such as the edge 172 of the plate 56 which may be modified to accept a higher rail outer plate 46.

Attachments of structural components for the frame 20 is generally accomplished by welding. However, the type of welding may depend on the materials used and other suitable attachment methods now known or hereafter discovered may be utilized for some attachment of the components of the present inventions.

Refer now to FIGS. 17 through 22 that illustrate a frame for a load handling vehicle according to an alternate preferred embodiment of the present invention. The frame is generally designated by reference numeral 320. The frame 320 and its components are constructed, assembled, function and interact in many respects generally similarly to the frame 20 and its components as described above. However, the frame 320 incorporates additional features that enhance its flexibility of design and modular construction, particularly for use for load handling vehicles, as described further below. For example, the frame 320 has side rails that extend farther to the rear behind the rear axle. Additional counterweights may be used at the rear as part of the side rails, thereby reducing or eliminating the need for counterweights on the rear module. Also, the extended side rails may serve as tracks for a translatable carriage formed by the rear module. Thus, depending on the desired configuration for the frame 320, the rear module may be permanently fixed to the rails, such as by welding, or provided with structure, such as wheels and hydraulic cylinders, for providing for forward and rearward moving the rear module along the side rails.

Figure 4:
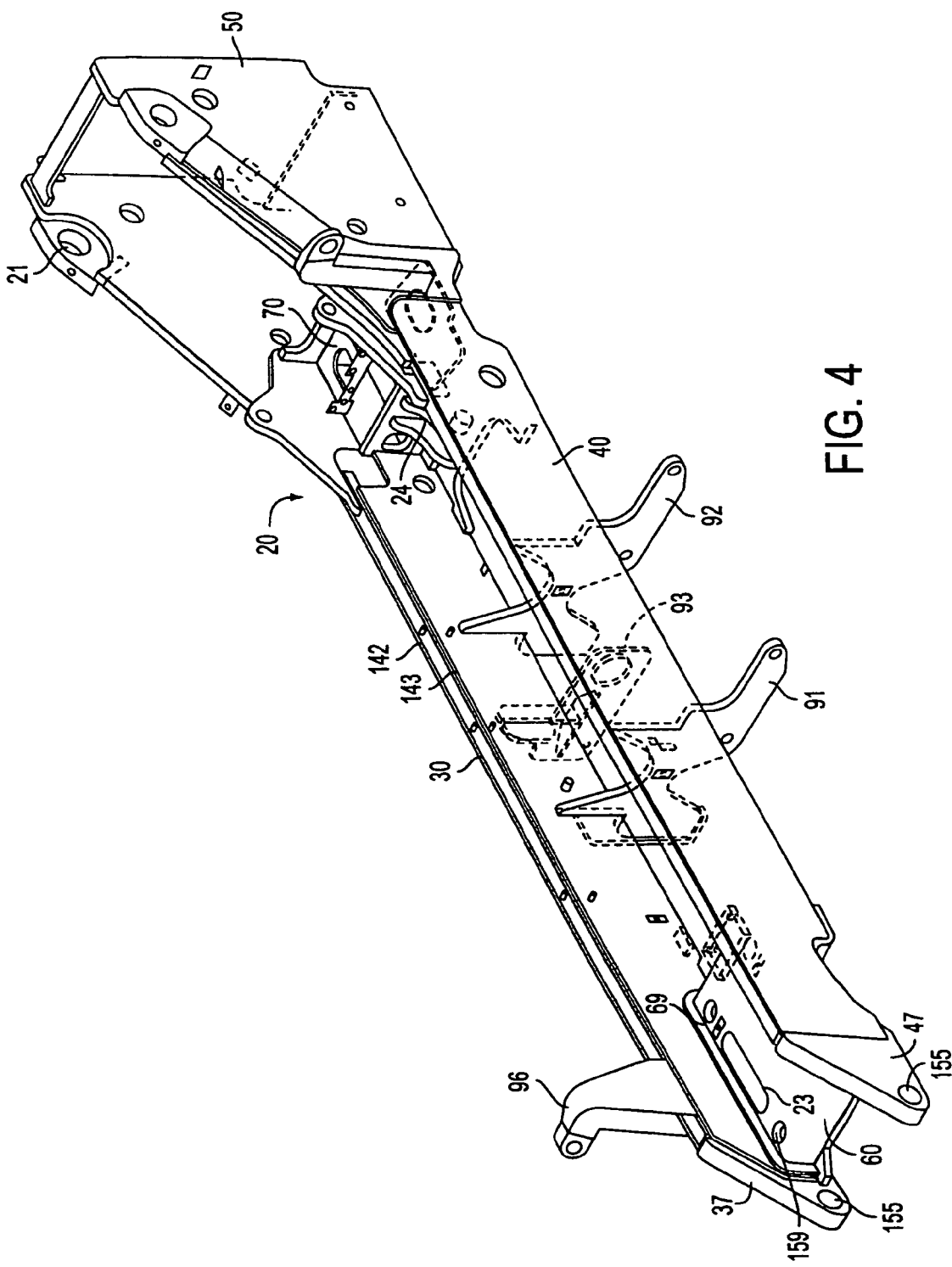
FIG. 4 is a perspective view of the frame of the load handler of FIG. 1.

The frame 320 includes a right side rail 330 and a left side rail 340. The side rails or beams 330 and 340 have a generally closed cross section to achieve desired stiffness and torsion strength. In the illustrated embodiment, the closed section is box shaped. The side rails 330 and 340 are connected together at a forward location 323 by a front axle mount pod 360, and at a rearward location 324 by a rear axle mount pod 370. The front axle mount pod 360 and the rear axle mount pod 370 are each also formed using closed section type construction for achieving stiffness and torsion strength. In the illustrated embodiment, the axle mount pods 360 and 370 are constructed essentially identical to the front axle mount pod 60 of the frame 20 (FIG. 4). However, upon assembly to the frame 320, the rear axle mount pod 370 is rotated one hundred eighty degrees so that its rear lower plate 65 faces forward.

Similar to the construction of the frame 20, the assembled frame 320, as well as its components, utilize closed sections to enhance stiffness and torsion strength of the components and the overall frame construction. For example, the left and right rails 330 and 340 joined with the axle mount pods 360 and 370 form a closed section.

In the illustrated embodiment, no transfer box mount or bulkhead frames are used, like are used in frame 20. However, a transfer box mount and bulkhead frames could be used to support drive train or other components and to add to the closed section construction and to the stiffness and torsion strength, including with respect to twisting motion about the longitudinal axis 324. In the absence of bulkhead frames, to support the operator cab 12 and the engine assembly 13, the frame 320 includes a pair of cab mounts 399 and a pair of engine mounts 398 welded to the rails 340 and 330, respectively. The front tilt tower 396 is mounted to the right side rail 330 proximate the location of the front axle mount pod 360. The rear stabilizing tower 394 is welded to the left side rail 340 proximate the location of the rear axle mount pod 370.

The front axle mount pod 360 provides a mounting position for the front axle 14 (FIG. 1). The pod 360 is desirably stiff to support the axle 14 and withstand torquing, bending, twisting, and compound loading forces exerted by the axle 14. Pod 360 is modularly configured to accept a range of sizes of axles. The front axle mount pod 360 is also a structural frame cross rail or beam positioned to extend between the side rails or beams 330 and 340 at a forward location 323. In the illustrated embodiment, the forward location 323 is proximate the front ends 332 and 342 respectively of the side rails 330 and 340; however, the forward location 323 could be selected at a more rearward location.

The rear axle mount pod 370 provides a mounting position for the rear axle 15 (FIG. 3). The rear axle mount pod 370 is also a structural frame cross rail or beam positioned to extend between the side rails or beams 330 and 340 at a rearward location 324. In the illustrated embodiment, the rearward location 324 is proximate to, but somewhat forward of, the rear ends 331 and 341 respectively of the side rails 330 and 340; however the rearward location 324 could be selected at a more forward or rearward location.

The rear module 350 includes a rear module right main plate 351 and a rear module left main plate 352 extending generally parallel with the axis 324 and connected together by a rear module support 358 extending across the width 321 of the frame 320 and attached to the rear module main plates 351 and 352.

Figure 17:
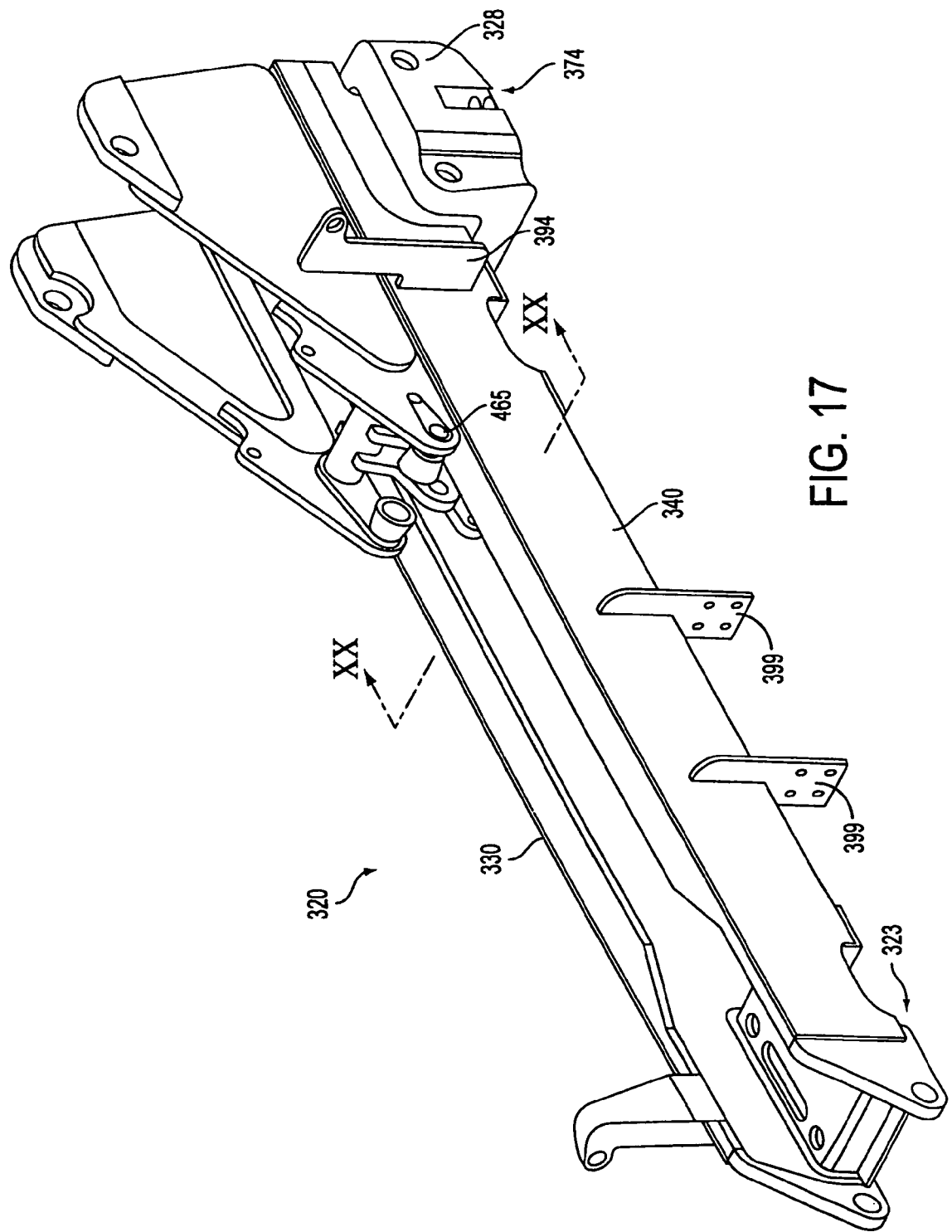
FIG. 17 is a perspective view of a frame for a load handler according to a second preferred embodiment of the present invention.

Attached to the inside front surfaces of the plates 351 and 352 are a rear module right slave ear plate 353 and a rear module left slave ear plate 354 respectively. The rear module 350 further includes a rear module right side plate 355 and a rear module left side plate 356 attached to the outer surfaces of the plates 351 and 352 respectively. Reinforced lugs 487 and 488 are provided at the rear ends of the plates 355 and 356 for defining the pivot point 321 of the boom 11. A mount 454 for cylinder 17 is attached to and extends between the slave ear plates 353 and 354. As described below, the rear module 350 may be permanently attached to the side rails 330 and 340 or may be mounted for forward and backward movement. As shown in the embodiment of FIG. 17, the wheels 460 are mounted on the rear module or carriage 350 to provide for rolling on the tracks 333 and 343 of side rails 330 and 340.

The various sizes of the various components of module 350 may be modified to accommodate different size rails 330 and 340 for different capacities of vehicle 10 as well as accommodate different size booms. Accordingly, a number of the components may be reused for various sizes and capabilities and configurations of vehicles tailor-made to a product order in an efficient flow type manufacturing process.

The left and right side rails 340 and 330 are constructed in similar fashion by the welding together of four plates as described above with reference to side rail 30 illustrated in FIG. 6 and as described below with reference to FIG. 19. The right side rail 330 includes a right side rail upper wall plate 333 and a right side rail lower wall plate 335.

The right side rail 330 includes a right side rail inner wall 334 and a right side rail outer wall 336. The inner wall 334 and the outer wall 336 are connected together with a right side rail upper wall 333 and right side rail lower wall 335 to form a generally box shaped closed cross section, as described further with reference to FIG. 19. At the right side rail front end 332 a right side rail plug or shoe 37 is inserted into the cavity 338. The plugs or shoes 37 and 47 function similar to the embodiment of FIG. 5, and are, for example, shaped and sized to accommodate the axle 314 and to provide desired ballast weight to the front end of the vehicle 10.

At the right side rail rear end 331 a right side rail plug or shoe 337 is inserted into the cavity 338. The plugs or shoes 337 and 347, are shaped and sized to accommodate the rear axle 315 and to provide desired ballast weight to the rear end of the vehicle 10. The shape of the plug 337 desirably forms a suitably sized reinforced closed cross-section support for the rear tilt tower 394.

Upon assembly of the various components of the frame 320, the side rail cavities are sealed and may be used to function as gas pressure relief tanks in connection with the hydraulic fluid system for the various hydraulic cylinders of the vehicle 10.

Figure 18:
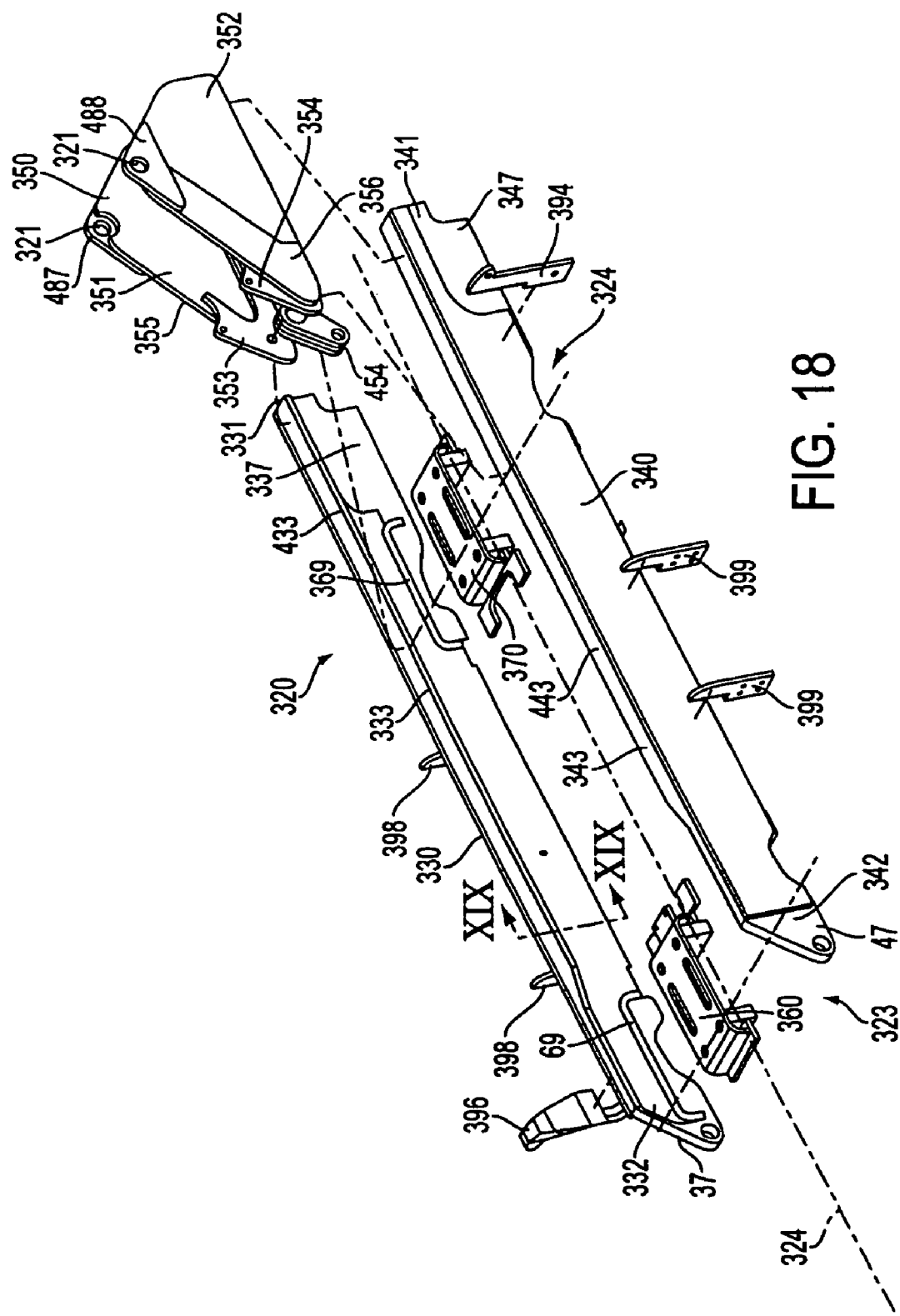
FIG. 18 is an exploded perspective view like FIG. 17.
Figure 19:
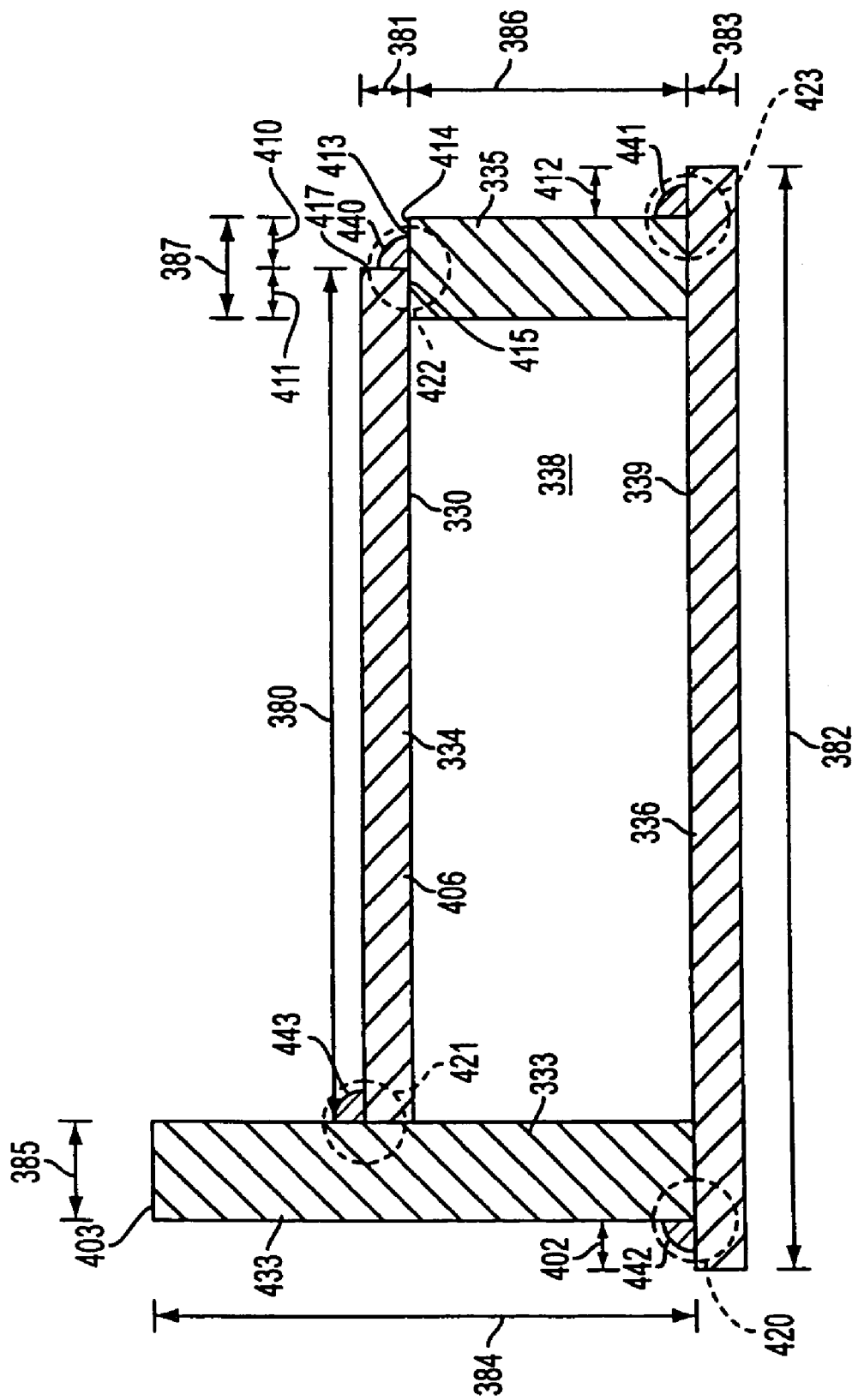
FIG. 19 is a view taken along section line XIX-XIX of FIG. 18.

Refer now to FIG. 19 which illustrates a cross section of the right side rail or beam 330 of the described embodiment of FIG. 18. The left side rail 340 is constructed in a similar fashion. The right side rail 330 is oriented in FIG. 19 with its outer wall 336 at the bottom of FIG. 19 to aid in discussion of the method of assembly of the side rail 330. The side rail 330 has generally a closed cross section with a cavity 338 formed by the various walls which define a perimeter of the beam 330, the inside perimeter being designated by reference numeral 339. The lower wall plate 335 has a width 386 and a thickness 387. The walls 333, 334, 335 and 336 also have respective lengths in the direction of the longitudinal axis 324 of the vehicle. The overall length of the rails or beams 330 and 340 may be longer than the length of one or more of the walls of the beams. The right side rail upper wall 333 has a width 384 and a thickness 385. The right side rail outer plate or wall 336 has a width 382 and a thickness 383. The right side rail inner wall or plate 334 has a width 380 and a thickness 381. The thicknesses generally extend across the edges of the plates.

Note that in the illustrated embodiment the width 380 of the right side rail inner plate 334 is a shorter than the width 382 of the right side rail outer plate 336. The width 380 and 382 are chosen, along with the thicknesses 385 and 387 of the upper and lower wall plates respectively, in achieving a welded construction with desired stiffness and torsion strength. As shown in FIG. 19 the walls or plates 333 and 335 are positioned over the outer right side rail wall or plate 336 set back by distances 402 and 412 respectively, to form inside welding corners for effecting the welds 441 and 442. These welding corners are in the regions of the dash line circles designated 420 and 423. Similarly, the plate or wall 334 is positioned with respect to the plates 333 and 335 to form welding inside corners for effecting welds 443 and 440 in the regions 421 and 422. Although the welding regions are identified by the circles, they are not limited to within that circle, but, rather, the circle designates the general region of the welding inside corner. Typical welds may be about five sixteenths of an inch or as desired. Also, although the welds 441, 442,443 and 444 are shown as beads in cross section and just residing in the corner, as materials are welded together, they fuse together and that fusion extends below the surfaces of the materials. That fusion is not shown in FIG. 19 for clarity of understanding of discussion of the overlap of the various dimensions of the plates or walls 333, 334, 335 and 336. Note that the inside weld corners 420,421, 422 and 423 extend generally along the length of the right side rail 330. Because of the requirements for the frame right side rail, all of the walls 333, 334, 335 and 336 may not have the same length or may have interruptions in their length to accommodate their particular requirements for the purpose for which the side rail is used. In the illustrated embodiment, such purpose is the construction of a frame for a load handling vehicle. In one aspect, the rail or beam construction described herein may be used as shown in the illustrated embodiment, or modified, for purposes other than for the described frame and vehicle embodiments.

The inside welding corner 420 has a dimension 402 defined by the positioning or abutting of a non-edge surface of the wall 333 with respect to a non-edge surface of the wall 336 and opens up and to the left of FIG. 19. Similarly, the inside welding corner 423 has a dimension 412 defined by the positioning or abutting of a non-edge surface of the wall 335 with respect to a non-edge surface of the wall 336 and opens up and to the right of FIG. 19. The inside welding corner 422 has a dimension 410 that is determined by the positioning or abutting of an edge surface of the wall 334 with respect to an edge surface of the wall 335 and opens up and to the right of FIG. 19. All of the welding corners open in an approximately common direction of upwards, or from the plate 336 towards the plate 334, in the illustrated embodiment. The inside corner 422 each has a dimension 381 corresponding to the thickness of the plate 334. The dimensions 381, 400, 402 and 412 are chosen to give sufficient welding inside corner surface area to effect the welds 440, 441, 442 and 443. The thicknesses 381 and 383 are also chosen considering the desired stiffness of the overall beam or rail 330. Similarly the thickness of the plate 335 is chosen to provide not only the sufficient inside corner surface or land 414, but also sufficient overlap 415, having dimension 411 with the inside surface 406 of plate 334. Also it may be desirable to maintain the ratio of the dimension 410 to the dimension 411 equal to a greater than one to one, because of lower ratios, as the dimension 110 becomes relatively smaller, the beam 330 may tend to spread apart somewhat because of heat expansion.

The upper wall plate 333 has a flange 433 that extends past the inner wall plate 334. The flange 433 and the flange 443 (FIG. 18) serve as tracks for forward and rearward movement of the rear module 50. In the frame 320, the flanges 433 and 443 extend inwardly and along the length of the side rails 330 and 340 a distance chosen based on the desired movement of the rear module or carriage 50, such as by appropriate hydraulic cylinders (not shown). Alternatively, the rear module may be permanently fixed to the plates 333 and 343 or other surfaces of the rails 330 and 340, such as by welding.

Generally the thicknesses of the plates or walls 333 and 335 will be thicker than the plates or walls 334 and 336. If the thickness of the walls 333 and 335 are sufficiently high, splitting or fracture of the material of plates 333 and 335 may be experienced during welding, for some materials. When using steel, this splitting may be alleviated to an extent by using cold rolled bars preformed flats or cold finished flats, for the thicker plates 333 and 335, which bars or flats have not been cut with heat prior to the welding process. The cutting of the bars with heat may weaken them and make them more susceptible to the splitting during the welding process. It is desirable that a sufficiently smooth surface be present on the inside welding corners such as on edge 413 of bar or plate 335, and the edge 417 of the plate 334. A "125" edge finish (sometimes referred to as a microfinish) or smoother has been found acceptable, however, rougher or smoother finishes may be acceptable for various applications. With the construction shown, the thicknesses 383 and 381 of the plates 334 and 336 may be small enough so that the plates may be cut and shaped for fitting into the vehicle frame 20 or other application of the beam 330, without experiencing the splitting effect upon welding. For example, a one and one-half inch thick steel plate may not experience the splitting effect upon welding, whereas a one-half inch thick steel plate may. This may vary with the steel alloy and quality.

Also as shown in FIG. 19 the inside welding corners 420, 421, 422 and 423 all open towards the top of the figure. This is beneficial in the manufacturing process so that the entire beam or rail 330 may be welded in a single pass using an automated welding machine, such as a Peck welding machine with four welding guns. Thus, the beam may be positioned and oriented as shown in FIG. 19 with the plate 336 resting on the table of the welding machine and all four of the welds 420, 421, 422 and 423 effected simultaneously with a single pass of the welding machine over the beam 330. The respective welds may be continuous unless a break is desired because of the contours of the plates, or otherwise. This has been found to provide a highly stiff structural beam 330 in an efficient process. Also, the components of the beam may be modified to make modular components for the frame construction. Particularly the widths 380 and 382 of the plates 334 and 336 respectively may be adjusted to increase the stiffness of the beam particularly in the direction of the widths. This corresponds to the vertical direction and rail height of the vehicle 10. Thus, the widths and the lengths as well as thickness of the component parts of the beam 330 as well as beam 340 may be conveniently changed to accommodate different load capacities to torsion strength and stiffness for the beams as well as for the frame 320 and the vehicle 10 of the illustrated embodiment.

Figure 20:
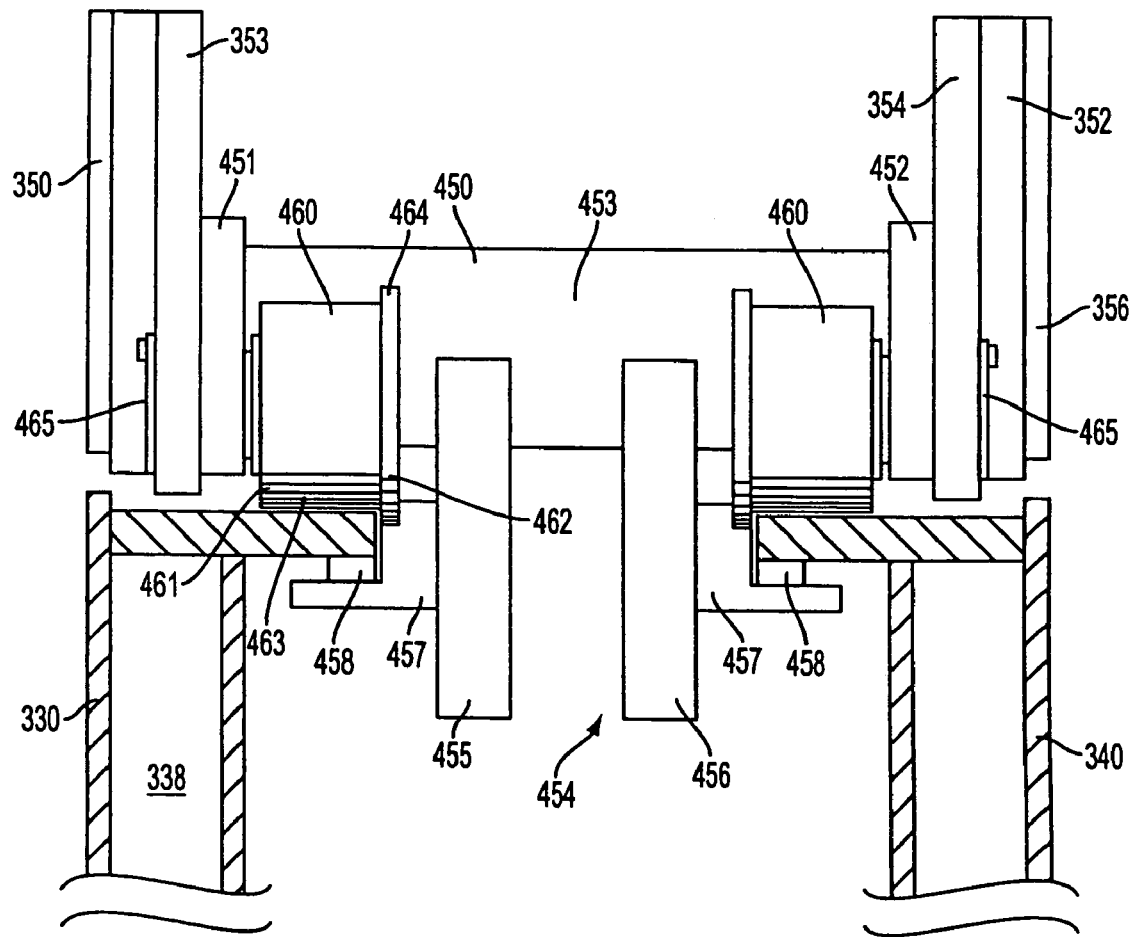
FIG. 20 is a view taken along section line XX-XX of FIG. 17.

Refer now to FIG. 20 which shows a partial front view of the carriage 350 resting on the rails 330 and 340. The two wheels 460 are mounted at the front of the carriage 350 and roll on the flanges 433 and 443 of the plates 333 and 343 of the side rails 330 and 340. Two wear pads 458 are also mounted at the front of the carriage 350 and extend below the flanges 433 and 443. In this manner, the flanges 433 and 443 are engaged by the front of the carriage 350 for movement forward and rearward on the frame 320.

The wheels 460 are mounted on axles 465 extending through the plates 451 and 452, and the slave ear plates 353 and 354, which plates are mounted respectively to the main plates 351 and 352 of the carriage 350. Each wheel 460, at its second side 462, has a circumferential lip flange 464 extending outwardly from the axle 465. In use, the lip 464 extends down below the top surface of the flanges 330 and 340 to help guide and orient the carriage 350, by engaging the edges of the flanges 330 and 340. The cylindrical outer rolling surface 463 of each wheel 460 at the front of the carriage 350 of the illustrated embodiment, rests on and rolls on the upper surface of the flanges 333 and 343. The rolling surface 463 extends from the first side 461 of the wheel 460 to the flange 464 at the second side 462 of the wheel 460. The diameter of the rolling surfaces increases slightly from the first side 461 to the second side 462. This tapered diameter of the rollers 460 helps to center and align the carriage 350 with respect to the frame 320.

The wear pads 458 are held at the bottom surfaces of the flanges 333 and 343 by brackets 457 which are attached to the pivot knuckles 455 and 456 of the pivot 454. The knuckles 455 and 456 are attached to the pivot 454 cross member 453 extending between plates 451 and 452. Preferably, the wear pads 458 are held in position close to or in compression with the flanges 333 and 343 to substantially maintain the wheels 460 in contact with the flanges 333 and 343. For typical applications where the load being handled by the vehicle 10 is held to the front, the load, as well as the carriage, will normally exert a downward force of the wheels 460 at the front of the carriage 350. However, in some circumstances, such as where for example the vehicle is not leveled from side to side, or the vehicle on an uphill grade and the boom is extended and raised, such downward force on the wheel 460 may be absent until the situation is corrected. The wear pads 458 and their associated mounting structure serve to hold the wheels 460 onto the flanges 333 and 343 in such circumstances.

Figure 21:
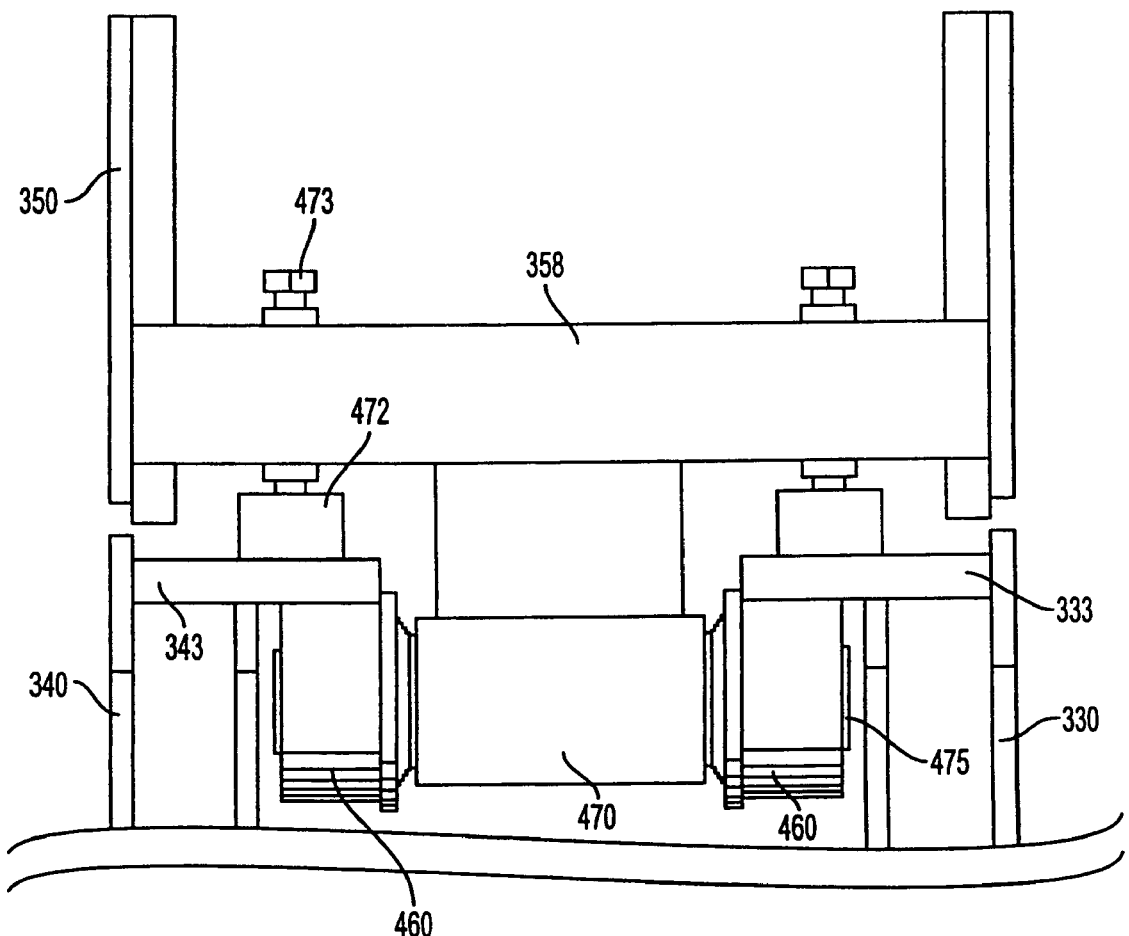
FIG. 21 is a partial rear elevation view of the frame of FIG. 17.

FIG. 21 shows the mounting of the wheels 460 and wear pads 472 at the rear of the carriage 350. The axle bracket 470 is mounted to the rear module support 358. Two wheels 460 are mounted to an axle 475 that extends through the axle bracket 470. The two wear pads are mounted at the end of the threaded bolts 473 that pass through and engage threads in the rear module support 358. Turning the bolts 473 adjusts the position or compression of the wear pads 472. The two wheels 460 and the two wear pads 472 mounted at the rear of the carriage engage the flanges 333 and 343 in a manner similar to the wheels and pads mounted at the front of the carriage 350. However, because the load carried by the vehicle 10 pulls upwardly on the back of the carriage 350 in most circumstances, the wheels 460 are mounted to engage the bottom of the flanges 333 and 343 and the wear pads are mounted to engage the top.

Figure 22:
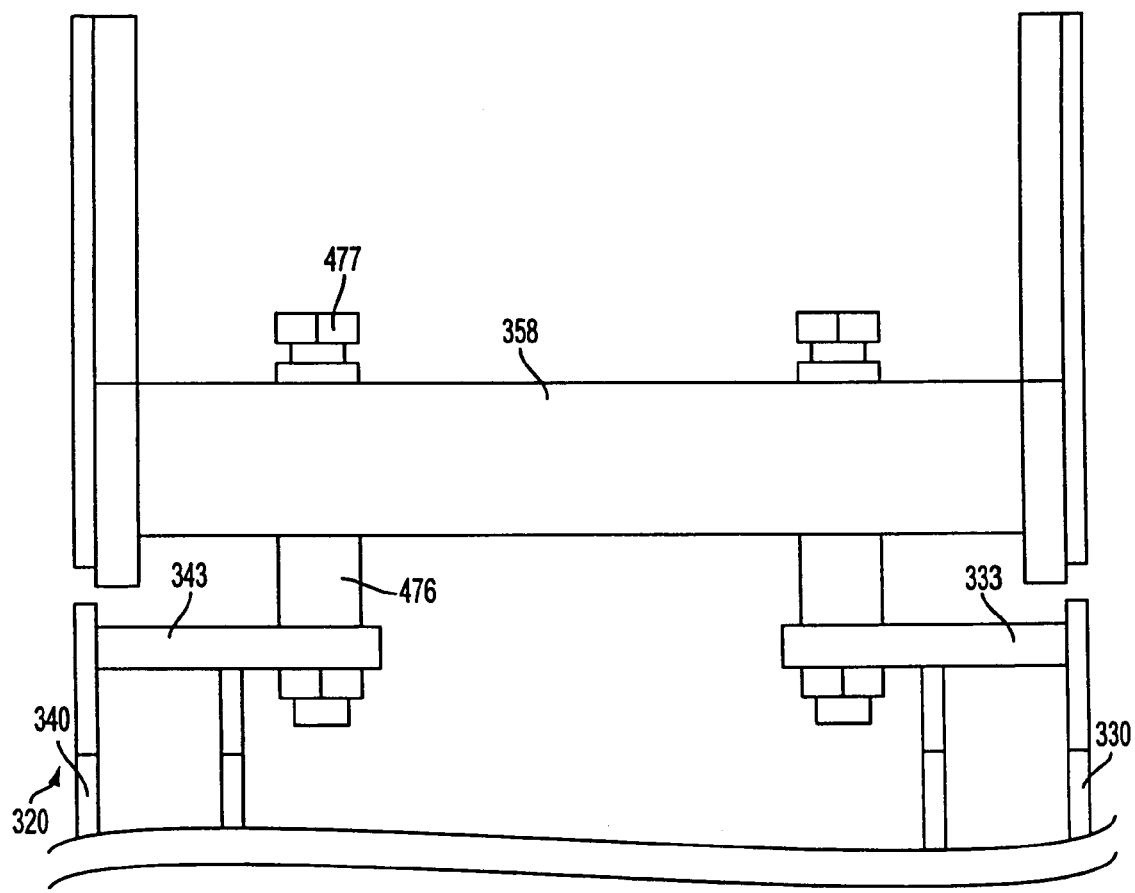
FIG. 22 is a view like FIG. 21.

Refer now to FIG. 22. If it is desire to fix the carriage 350 to the frame 320, bolts 477 may be extended through the rear module support 358 and through spacers 476 to engage the flanges 343 and 333. In the illustrated embodiment, the bolts 477 extend through the same holes the rear module support 358 as used by the bolts 473, and the wheels are not thus not mounted. However, the bolts 477 could use additional holes or mounting structure, or some other carriage fixing structure could be employed; in such case, particularly where removable fixing structure is used, the wheels could also be included for use when desired.

A frame, such as a loader vehicle frame, constructed according to the present inventions, has a strong, durable, compact design, improved torsion strength, and with a small turning radius. The frame is modular in design and can be quickly assembled using a flow manufacturing process and design modifications can be efficiently incorporated into the modular design.

The above description and drawings are only illustrative of preferred embodiments of the present inventions, and are not intended to limit the present inventions thereto. For example, an embodiment shown has a closed section beam formed by four plates to form a rectangular closed section, however the invention is not limited to this arrangement. In addition, an illustrated embodiment includes a single-pass beam welding operation where all weld positions are oriented in a common direction, however other welding arrangements could be used. Also, for example, a described embodiment includes a stationary beam pivot point. However other mounting arrangements could be used, such as a pivot point on a translatable carriage. Any subject matter or modification thereof which comes within the spirit and scope of the following claims is to be considered part of the present inventions.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A load handler comprising:
   a boom displaceable between a lowered position and a raised position; and
   a frame having:

a left side rail and a right side rail, each having a closed cross-section and a front end and a rear end and being continuous from the front end to the rear end;

a plurality of cross rails rigidly affixed between said side rails, including a front cross rail having a closed cross-section and rigidly affixed between said side rails at a forward location, and a rear cross rail having a closed cross-section and being rigidly affixed between said side rails at a rearward location, wherein said left side rail, said right side rail and said cross rails define a channel that receives said boom superimposed within the left side rail and the right side rail when said boom is in said lowered position.

2. A load handler according to claim 1, wherein the front cross rail comprises a front axle mount pod, the front axle mount pod providing a mounting position for a front axle of the load handler.

3. A load handler according to claim 1, wherein the rear cross rail comprises a rear axle mount pod, the rear axle mount pod providing a mounting position for a rear axle of the load handler.

4. A load handler comprising:
a vehicle frame supported on front and rear axles;
a boom secured to the vehicle frame at a first end and pivotable between a lowered position and a raised position;
a lift cylinder secured between the vehicle frame and the boom; and
a load handling device pivotally secured to a second end of the boom,
wherein the vehicle frame comprises:
a left side rail and a right side rail, each having a closed cross-section and a front end and a rear end and being continuous from the front end to the rear end, and
a plurality of cross rails rigidly affixed between said side rails, including a front cross rail having a closed cross-section and rigidly affixed between said side rails at a forward location, and a rear cross rail having a closed cross-section and being rigidly affixed between said side rails at a rearward location,
wherein said left side rail, said right side rail and said cross rails define a channel that receives the boom superimposed within the left side rail and the right side rail when the boom is in the lowered position.

5. A load handler according to claim 4, wherein the front cross rail comprises a front axle mount pod, the front axle mount pod providing a mounting position for the front axle.

6. A load handler according to claim 4, wherein the rear cross rail comprises a rear axle mount pod, the rear axle mount pod providing a mounting position for the rear axle.

* * * * *